United States Patent
Narvaez et al.

(10) Patent No.: US 11,127,215 B1
(45) Date of Patent: Sep. 21, 2021

(54) LED EMITTER TIMING ALIGNMENT FOR IMAGE-BASED PERIPHERAL DEVICE TRACKING IN ARTIFICIAL REALITY SYSTEMS

(71) Applicant: Facebook Technologies, LLC, Menlo Park, CA (US)

(72) Inventors: Mauricio Narvaez, Mountain View, CA (US); Shreyas Narendra Basarge, Mountain View, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/577,792

(22) Filed: Sep. 20, 2019

(51) Int. Cl.
*G06T 19/00* (2011.01)
*G02B 26/02* (2006.01)
*G02B 27/01* (2006.01)
*G09G 3/00* (2006.01)
*G09G 3/20* (2006.01)

(52) U.S. Cl.
CPC .......... *G06T 19/006* (2013.01); *G02B 26/026* (2013.01); *G02B 27/0172* (2013.01); *G09G 3/001* (2013.01); *G09G 3/2003* (2013.01); *G02B 2027/0118* (2013.01); *G02B 2027/0178* (2013.01); *G02B 2027/0187* (2013.01); *G09G 2300/023* (2013.01)

(58) Field of Classification Search
CPC ................ G06T 19/006; G02B 26/026; G02B 27/0172; G09G 3/001; G09G 3/2003

USPC ........................................................ 345/633
See application file for complete search history.

(56) References Cited

U.S. PATENT DOCUMENTS

| | | | |
|---|---|---|---|
| 10,393,929 B1* | 8/2019 | Bikumandla | G02B 27/0172 |
| 2015/0375327 A1* | 12/2015 | Becker | G06T 1/00 345/440 |
| 2016/0282936 A1* | 9/2016 | Larson | A61B 5/7221 |
| 2018/0095542 A1* | 4/2018 | Mallinson | G06F 1/163 |

* cited by examiner

*Primary Examiner* — Hai Tao Sun
(74) *Attorney, Agent, or Firm* — Shumaker & Sieffert, P.A.

(57) ABSTRACT

An artificial reality system is described that includes a head mounted display (HMD) configured to output artificial reality content and image capture devices configured to capture image data of a peripheral device positioned within a physical environment, where the image data comprises a plurality of successive image frames and the image capture devices capture each image frame during an exposure window of a respective frame period. The artificial reality system further includes a waveform controller configured to program a pulse waveform for a plurality of emitters on a peripheral device, wherein the pulse waveform specifies a pattern by which the plurality of emitters emit light and a pulse emitter synchronizer configured to synchronize the emission of light by the plurality of emitters according to the pulse waveform with the exposure window over the successive image frames from the image capture devices.

15 Claims, 15 Drawing Sheets

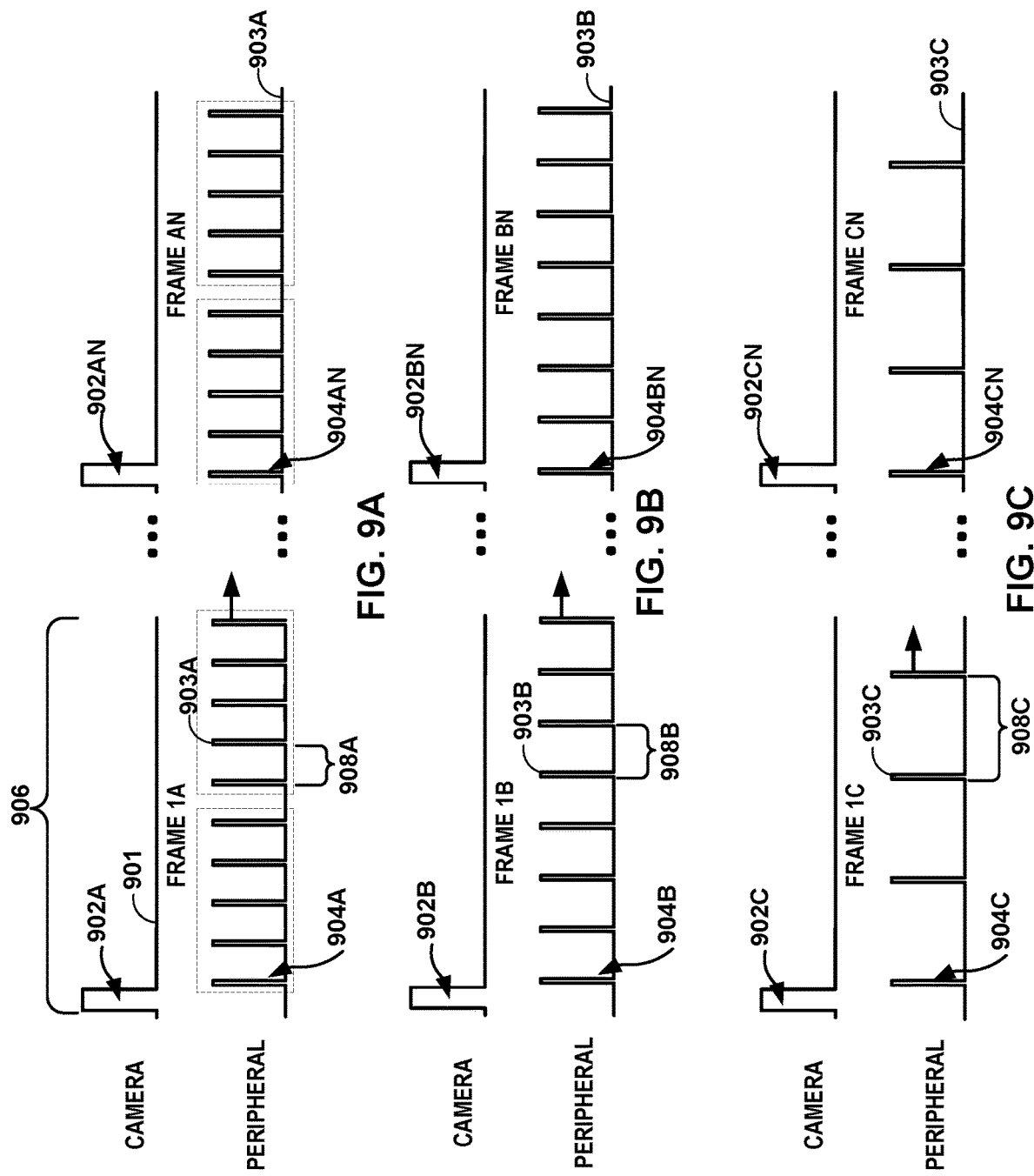

LED EMITTER TIMING ALIGNMENT FOR IMAGE-BASED PERIPHERAL DEVICE TRACKING IN ARTIFICIAL REALITY SYSTEMS

TECHNICAL FIELD

This disclosure generally relates to artificial reality systems, such as virtual reality, mixed reality, and/or augmented reality systems, and more particularly, to tracking peripheral devices in artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user may utilize one or more peripheral devices (e.g., keyboard, mouse, hand-held controller) to interact with applications or interact with the artificial reality system. A graphical representation of the one or more peripheral devices may be rendered within the artificial reality based on the position and orientation of the one or more peripheral devices.

SUMMARY

In general, this disclosure describes artificial reality (AR) systems and, more specifically, a peripheral device tracking sub-system for an AR system that includes a head mounted display (HMD) and image capture devices (e.g., cameras) to determine and track the pose of one or more peripheral devices. In some examples, the peripheral devices may be keyboards, mice, controllers, and/or other devices that periodically pulse a constellation of emitters (e.g., infrared LEDs) located at predetermined positions on the peripheral device.

Techniques are described for aligning timing waveforms of light emitters of a tracked peripheral device with image capture exposure windows of the AR system. In operation, the tracking sub-system of the AR system may use the image capture devices to capture image data (e.g., image frames) during small exposure periods of time to identify, within the image data, active emitters and determine a current pose of the peripheral device based of the location of the active emitters detected from the captured image data. By capturing and processing small windows of image data to detect the emitters that are activate for short, periodic bursts, the tracking sub-system reduces power consumption and computational resource expenditure for tracking of the peripheral device. Moreover, techniques are described to ensure that timing of emitter pulsing (e.g., being active) falls within the exposure (capture) window of the image capture devices, thereby enabling the system to reduce the time duration of the periodic window during which image data is collected yet maintain tracking of the peripheral device(s).

In some examples, the techniques described herein utilize a visual search of captured image data to synchronize exposure windows of the peripheral device tracking sub-system and the emitters of the peripheral device. For example, the AR system may repeatedly shift in time the pulsing of the emitters on the peripheral device until the timing of the emitter pulses fall within the small exposure (capture) window of image capture devices. In various examples, optimized visual search techniques are utilized to reduce time and resources of converging to alignment of the emitter pulses and the capture windows.

In some examples, the AR system may utilize timestamp information to synchronizing pulse emitters on a peripheral device with the small exposure periods of the image capture components of the tracking sub-system. For example, the AR system may periodically obtain and store timestamps from the peripheral device over a wireless protocol and corresponding timestamps from the AR system, and use that timing information (e.g., timestamp pairs) to synchronize the image capture components of the tracking sub-system and pulse emitters of the peripheral device.

In some examples, the AR system may use the timing information (e.g., timestamp pairs) to form an initial estimate of alignment so as to narrow a search space for visual search operations through image data—resulting in faster clock compensation. That is, rather than rely solely on timing information communicatively exchanged between the tracking sub-system and the tracked peripheral device (e.g., via a wireless protocol), the AR system may further and more precisely align the exposure window of the image-based tracking sub-system and the LED emitter waveform of the peripheral device using a visual search through captured image data to refine the initial estimate determined from timing information exchanged over the wireless protocol.

These techniques may be beneficial in systems where only limited information can be directly exchanged between the tracking system and the tracked peripheral device, such as where the peripheral device is a third-party device communicating according to a standard wireless communication protocol (e.g., Bluetooth, Bluetooth Low Energy (BLE), Wi-Fi).

In one or more example aspects, an artificial reality system including a head mounted display (HMD) configured to output artificial reality content; one or more image capture devices configured to capture image data of a peripheral device positioned within a physical environment, wherein the image data comprises a plurality of successive image frames, and wherein the one or more image capture devices capture each image frame during an exposure window of a respective frame period; a waveform controller configured to program a pulse waveform for a plurality of emitters on a peripheral device, wherein the pulse waveform specifies a pattern by which the plurality of emitters emit light; and a pulse emitter synchronizer configured to synchronize the emission of light by the plurality of emitters according to the pulse waveform with the exposure window over the successive image frames from the one or more image capture devices.

In one or more further example aspects, a method includes obtaining, by an artificial reality system including a head-mounted display (HMD), image data of a peripheral device positioned within a physical environment via one or more image capture devices, wherein the HMD configured to output artificial reality content, wherein the image data comprises a plurality of successive image frames, and wherein the one or more image capture devices capture each image frame during an exposure window of a respective frame period; programming, by a waveform controller, a pulse waveform for a plurality of emitters on the peripheral device, wherein the pulse waveform specifies a pattern by which the plurality of emitters emit light; synchronizing, by a pulse emitter synchronizer, the emission of light by the plurality of emitters according to the pulse waveform with the exposure window over the successive image frames from the one or more image capture devices; and processing, by a peripheral tracker, the image data to determine respective locations for at least a subset of the active plurality of emitters within an image frame of the image data to determine a peripheral device pose representing a position and orientation of the peripheral device based on the respective locations for the subset of the active plurality of emitters within the image frame.

In one or more additional example aspects, a non-transitory, computer-readable medium comprising instructions that, when executed, cause one or more processors of an artificial reality system including a head-mounted display (HMD) configured to output artificial reality content to: capture image data of a peripheral device positioned within a physical environment, wherein the image data comprises a plurality of successive image frames, and wherein the one or more image capture devices capture each image frame during an exposure window of a respective frame period; program a pulse waveform for a plurality of emitters on the peripheral device, wherein the pulse waveform specifies a pattern by which the plurality of emitters emit light; synchronize the emission of light by the plurality of emitters according to the pulse waveform with the exposure window over the successive image frames from the one or more image capture devices; and process the image data to determine respective locations for at least a subset of the active plurality of emitters within an image frame of the image data to determine a peripheral device pose representing a position and orientation of the peripheral device based on the respective locations for the subset of the active plurality of emitters within the image frame.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 9A-9E are waveforms illustrating visual search operations for synchronizing pulse emitters on a peripheral device in accordance with the techniques of the disclosure.

Like reference characters refer to like elements throughout the figures and description.

DETAILED DESCRIPTION

Figure 1A:
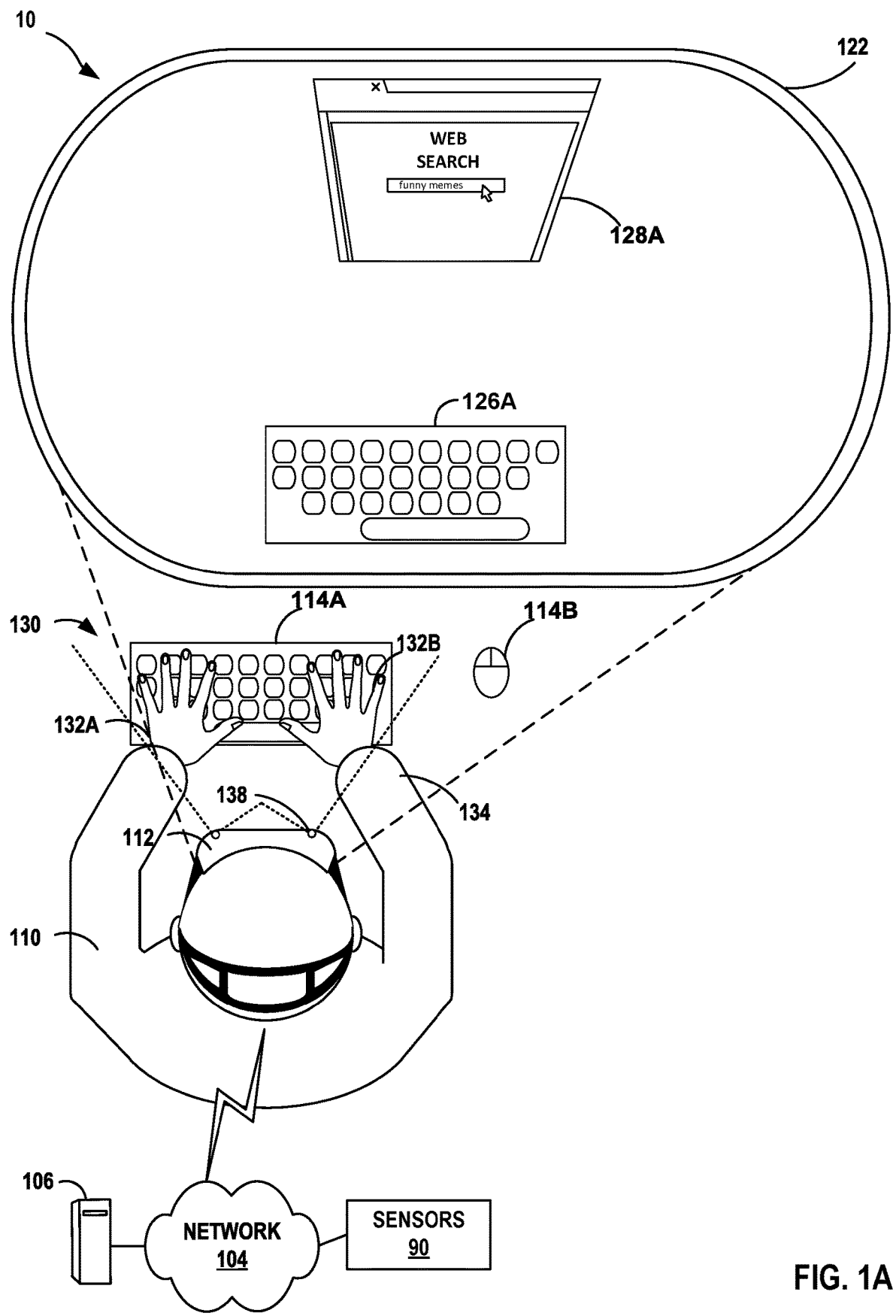
FIG. 1A is an illustration depicting an example artificial reality system that performs pose tracking for one or more peripheral devices in accordance with the techniques of the disclosure.

FIG. 1A is an illustration depicting an example artificial reality system 10 that performs pose tracking for one or more peripheral devices 114A and 114B (collectively, "peripheral devices 114") and, in particular, alignment of pulse emitters of the peripheral devices and exposure windows of image capture components of artificial reality system 10 in accordance with the techniques of the disclosure. The one or more peripheral devices 114 may comprise one or more of a keyboard (e.g., as shown in FIG. 1A), mouse, controller, or any other device that provides for user interaction with artificial reality system 10. In some example implementations, artificial reality system 10 generates and renders one or more virtual graphical representations 126 of the one or more peripheral devices 114 to a user 110 based on one or more detected poses of one or more peripheral devices 114 operated by user 110.

In the example of FIG. 1A, artificial reality system 10 includes head mounted device (HMD) 112. As shown, HMD 112 is typically worn by user 110 and includes an electronic display and optical assembly for presenting artificial reality content 122 to user 110. In addition, HMD 112 includes one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment.

In some example implementations HMD 112 operates as a stand-alone, mobile artificial reality system. In other implementations, an artificial reality system 10 can optionally include a console 106 and/or one or more external sensors 90 in addition to, or instead of HMD 112. In the example illustrated in FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on HMD 112 and/or console 106. As one example, artificial reality content 122 may be an artificial reality (AR) workspace (e.g., workstation) application including one or more virtual application windows 128, with which user 110 may interact with using the one or more peripheral devices 114, are rendered. The one or more virtual application windows 128 may comprise one or more of a word processing application, a spreadsheet application, a presentation application, a social media application, a web browser application, a video conferencing application, a chat application, a navigation application, an educational application, training or simulation applications, consumer gaming applications, or other types of applications. In some examples, artificial reality content 122 may comprise a mixture of real-world imagery and virtual objects, e.g., mixed reality and/or augmented reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by current estimated pose of HMD 112 and current estimated poses for one or more peripheral devices 114, the artificial reality application renders 3D artificial reality content which, in some examples, may be overlaid, at least in part, upon the real-world, 3D physical environment of user 110. During this process, the artificial reality application uses sensed data received from HMD 112 and the one or more peripheral devices 114, such as movement information and user commands, and, in some examples, data from any external sensors 90, such as external cameras, to capture 3D information within the real world, physical environment, such as motion by user 110 and/or motion of the one or more peripheral devices 114. Based on the sensed data, the artificial reality application determines a current pose for the frame of reference of HMD 112, a current pose for the one or more peripheral devices 114 and, in accordance with the current poses of the HMD 112 and one or more peripheral devices 114, renders the artificial reality content 122. In accordance with the techniques of this disclosure, the artificial reality system 10 can determine a pose for the one or more peripheral devices 114 based on data from sensors or cameras of an artificial reality system 10 when the one or more peripheral devices 114 are trackable within the field of view of the sensors or cameras, and, in some examples, artificial reality system 10 can use sensor data and/or other peripheral device measurement data when the one or more peripheral devices 114 are not trackable within the field of view of the sensors or cameras.

Figure 1B:
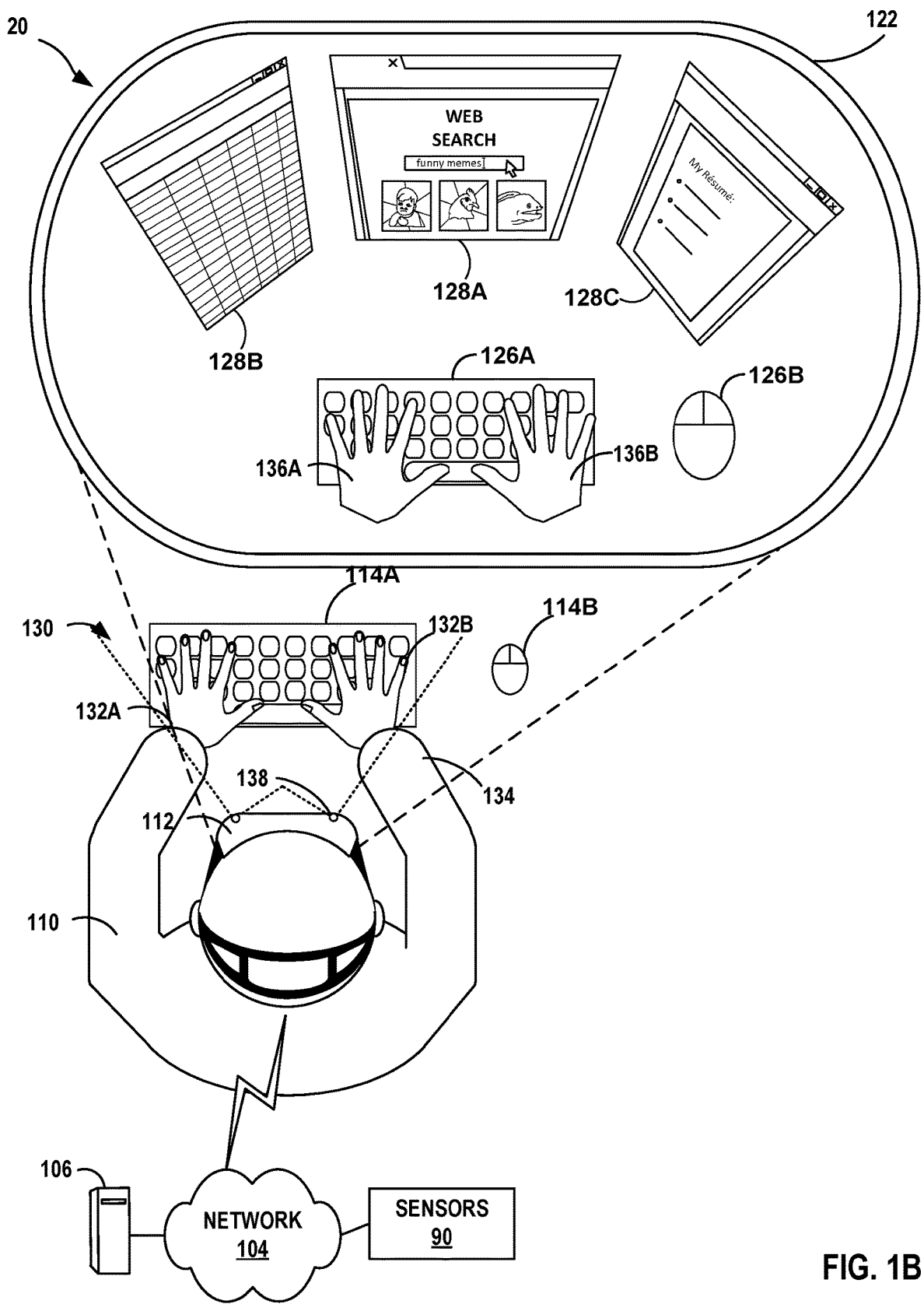
FIG. 1B is an illustration depicting an example artificial reality system that performs pose tracking for one or more peripheral devices in accordance with the techniques of the disclosure.

More specifically, as further described herein, image capture devices 138 of HMD 112 capture image data representative of objects in the real world, physical environment that are within a field of view 130 of image capture devices 138. These objects can include the one or more peripheral devices 114. Field of view 130 typically corresponds with the viewing perspective of HMD 112. In some examples, the artificial reality application renders the portions of hands 132A, 132B of user 110 that are within field of view 130 as virtual hands within artificial reality content 122 (e.g., hands 136A, 136B as shown in FIG. 1B). Further, the artificial reality application can render virtual objects such as virtual peripheral device 126A based on a pose of peripheral devices 114A.

In operation, a tracking sub-system of the artificial reality system 10 may use the image capture devices 138 to capture image data (e.g., image frames) during small exposure periods of time to identify, within the image data, locations for one or more active emitters (not shown in FIG. 1A) and determine a current pose of peripheral device 114A based on the location of the active emitters detected in the captured image data. By capturing and processing small windows of image data to detect emitters that are activate for short, periodic bursts, the tracking sub-system reduces power consumption and computational resource expenditure for tracking of one or more peripheral devices 114. As further described herein, a tracking sub-system of the artificial reality system 10 may help synchronize the timing of pulses produced by the emitters of the one or more peripheral devices 114 with the small exposure windows of the image capture components of artificial reality system 10 to ensure that timing of emitter pulsing (e.g., being active) falls within the exposure (capture) window of the image capture devices, thereby enabling the system to reduce the time duration of the periodic window during which image data is collected yet maintain tracking of the peripheral device(s). These techniques may be beneficial in systems where the internal clocks of AR system 10 and peripheral devices 114 are not tightly synchronized and where only limited timing information can be directly exchanged between the tracking system and the tracked peripheral device, such as where peripheral device 114A is a third-party device communicating according to a standard wireless communication protocol (e.g., Bluetooth, Bluetooth Low Energy (BLE), Wi-Fi).

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering graphical representation 126A based on poses determined for peripheral device 114A. In this way, the user may provide accurate user inputs with respect to virtual graphical representations 126 at a physical peripheral device 114 and with peripheral device 114 providing natural haptic feedback. The techniques may additionally reduce power consumption by capturing and processing small windows of image data to detect emitters on the one or more peripheral devices 114 that are activate for short, periodic bursts.

FIG. 1B is an illustration depicting an example of artificial reality system 20 that performs LED pulse alignment for multiple peripheral devices 114 with the exposure windows of artificial reality system 20 in accordance with the techniques of the disclosure. Similar to artificial reality system 10 of FIG. 1A, in some examples, artificial reality system 20 of FIG. 1B may present and control one or more virtual windows 128 for user interaction and manipulation within an artificial reality environment based on user input received at one or more peripheral devices 114.

In the example of FIG. 1B, artificial reality system 20 generates and renders virtual graphical representations 126A and 126B of peripheral devices 114A and 114B, respectively, based on the detected poses of peripheral devices 114A and 114B (collectively, "peripheral devices 114"). As shown in FIG. 1B, artificial reality system 20 may represents a multi-window environment in which an artificial reality application executing on HMD 112 and/or console 106 presents artificial reality content to user 110 based on a current viewing perspective of a corresponding frame of reference for the user. Artificial reality system 20 uses data received from HMD 112 and peripheral devices 114 to capture 3D information within the real world environment, such as motion by users 110 and/or tracking information with respect to peripheral devices 114 for use in computing updated pose information for the peripheral devices 114 within a corresponding frame of reference of HMDs 112.

As one example, the artificial reality application may render, based on a current viewing perspective determined for HMD 112, artificial reality content 122 including virtual application windows 128A, 128B, and 128C (collectively, "virtual application windows 128"). In the example shown in FIG. 1B, virtual application windows 128A corresponds to a web-browser application, virtual application windows 128B corresponds to a spreadsheet application, and virtual application windows 128 corresponds to a word processing application. While FIG. 1B illustrates three virtual application windows 128, it is understood that more or less virtual application windows 128 may be rendered. User 110 may interact with each of virtual application windows 128 by entering user input at peripheral devices 114A and/or 114B (e.g., keyboard and mouse, respectively). For example, artificial reality system 20 renders virtual graphical representation 126A (e.g., a virtual keyboard) of peripheral device 114A based on the current pose of peripheral device 114A and virtual graphical representation 126B (e.g., a virtual mouse) of peripheral device 114B based on the current pose of peripheral device 114B. In this way, user 110 may use virtual graphical representations 126 as a visual aid to accurately enter user input at peripheral devices 114 while peripheral devices 114 provide natural haptic feedback. Additionally, artificial reality system 20 may render the portions of hands 132A, 132B of user 110 that are within field of view 130 as virtual hands 136A, 136B within artificial reality content 122, which may further aid 110 in entering accurate user input at peripheral devices 114. Peripheral devices 126 may be in communication with HMD 112C according to a standard wireless communication protocol (e.g., Bluetooth, Bluetooth Low Energy (BLE), Wi-Fi) and artificial reality system 20 may manipulate or otherwise interact with one or more virtual application windows in response to receiving the user input over the standard wireless communication protocol.

Figure 1C:
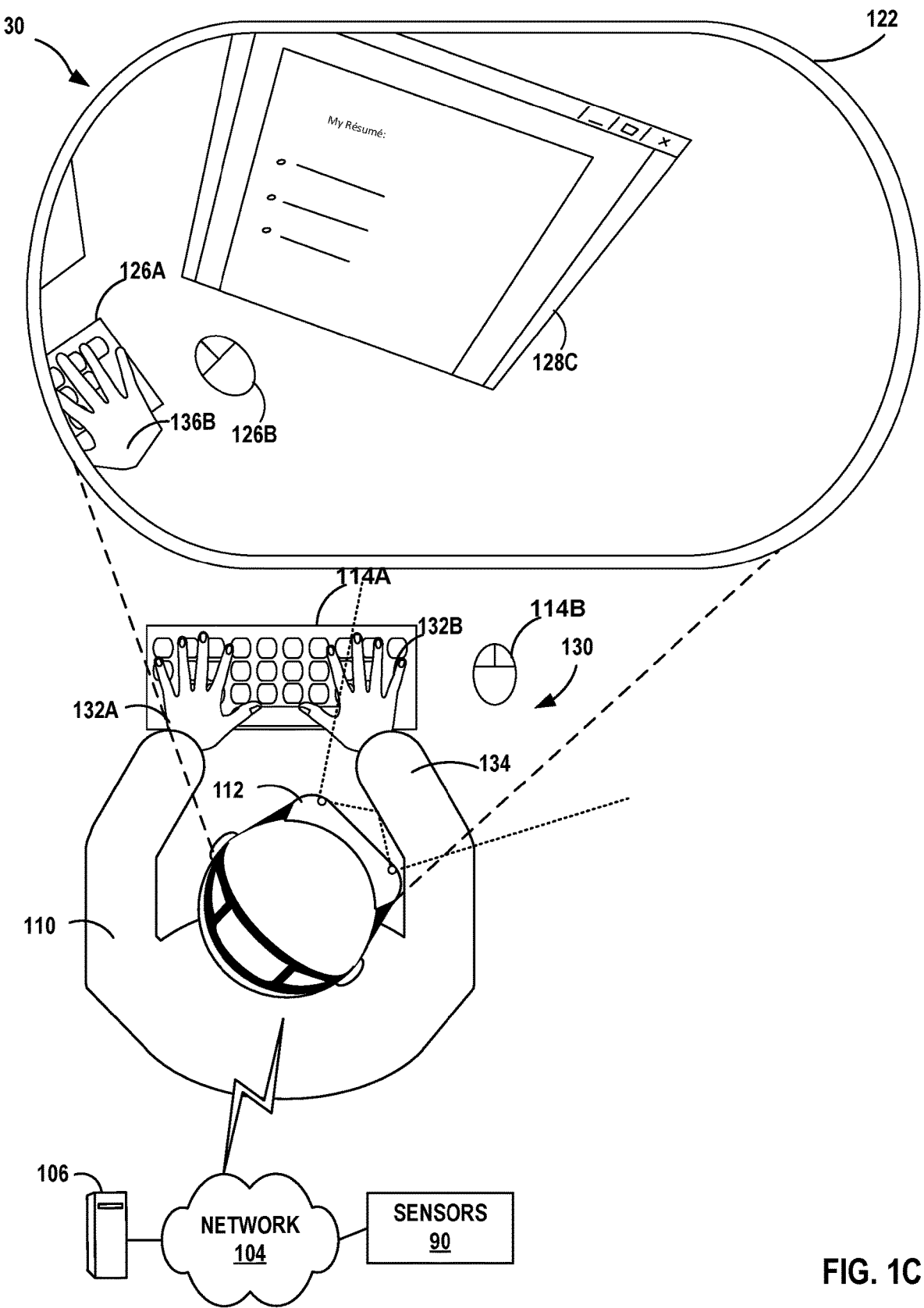
FIG. 1C is an illustration depicting an example artificial reality system that performs pose tracking for one or more peripheral devices in accordance with the techniques of the disclosure.

FIG. 1C is an illustration depicting an example of artificial reality system 20 in which user 110 has turned his head toward virtual application window 128C (e.g., a word processing application), changing the viewing perspective of HMD 112 and, thus, field of view 130 of image capture devices 138. As shown in FIG. 1C, peripheral device 114B (e.g., a mouse) and at least a portion peripheral device 114A and hand 132B remain in field of view, enabling artificial reality system 20 to render virtual graphical representations 126B corresponding to peripheral device 114B and at least a portion of virtual graphical representations 126A and virtual hand 136B corresponding to peripheral device 126 and hand 132B, respectively.

Similar to artificial reality systems 10, a tracking sub-system of the artificial reality system 20 may use the image capture devices 138 to capture image data (e.g., image frames) during small exposure periods of time to identify, within the image data, active emitters of peripheral device 114B (not shown in FIG. 1C) and determine a current pose of peripheral device 114B based on the location of the active emitters detected in the captured image data. In some examples, the tracking sub-system of the artificial reality system 20 may also determine a current pose of peripheral device 114A using data received from HMD 112, sensors 90, and/or peripheral device 114. For example, the tracking sub-system of the artificial reality system 20 may use movement information from HMD 112 and/or from the peripheral device in combination with a previous pose of peripheral device 114A to determine a current pose of peripheral device 114A.

Figure 2A:
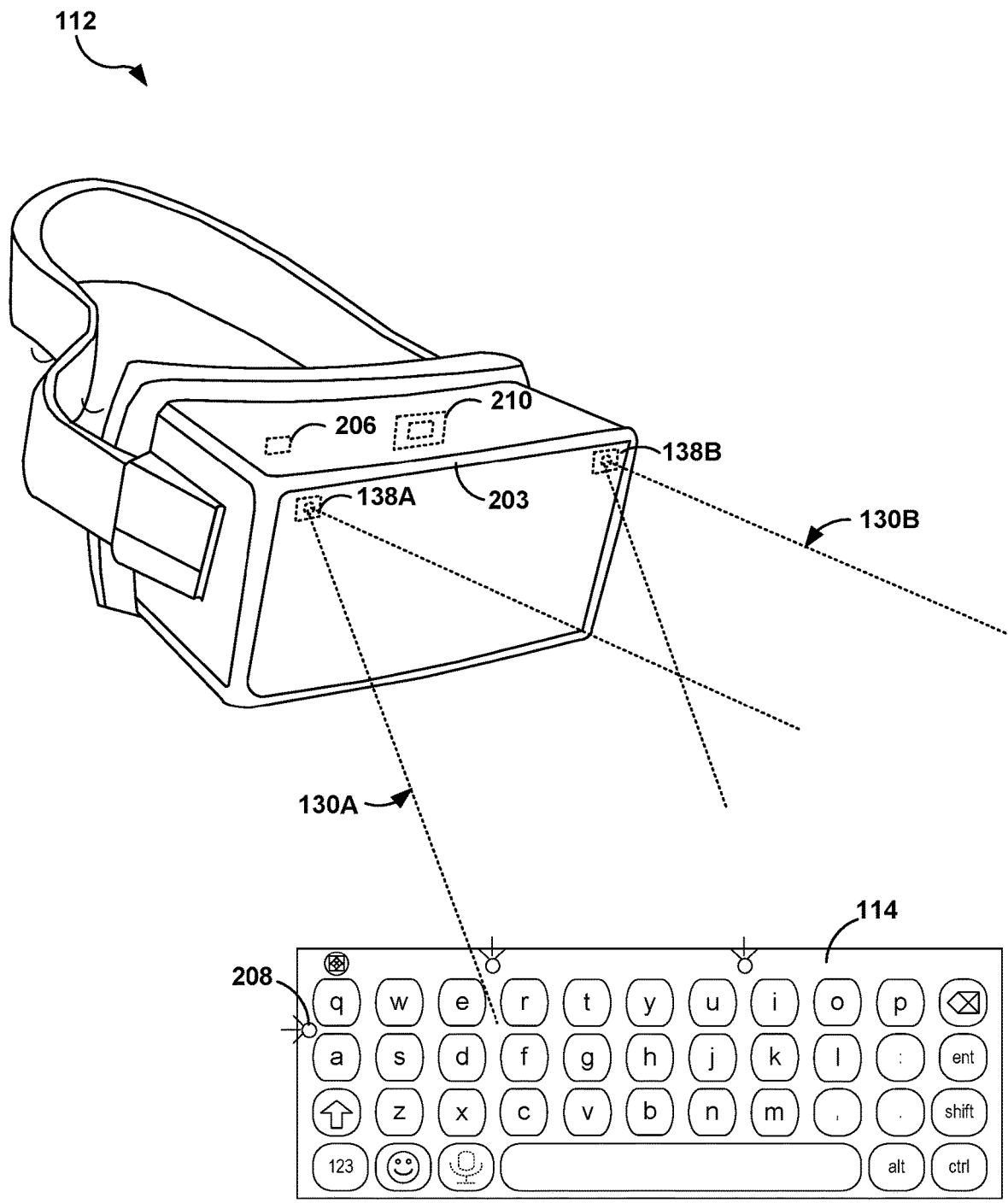
FIG. 2A is an illustration depicting an example HMD and an example peripheral device, in accordance with techniques of the disclosure.

FIG. 2A is an illustration depicting an example HMD 112 and peripheral device 114 configured to operate in accordance with the techniques of the disclosure. HMD 112 of FIG. 2A may be an example of any of HMDs 112 of FIGS. 1A-1C. HMD 112 may operate as a stand-alone, mobile artificial realty system configured to implement the techniques described herein or may be part of an artificial reality system, such as artificial reality systems 10, 20 of FIGS. 1A-1C.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of peripheral device 114 with respect to the HMD 112. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, still cameras, IR scanners, UV scanners, laser scanners, Doppler radar scanners, depth scanners, or the like, configured to output image data representative of the physical environment. In some aspects, the image capture devices 138 can capture image data from a visible spectrum and an invisible spectrum of the electromagnetic spectrum (e.g., IR light). The image capture devices 138 may include one or more image capture devices that capture image data from the visible spectrum and one or more separate image capture devices that capture image data from the invisible spectrum, or these may be combined in the same one or more image capture devices. More specifically, image capture devices 138 capture image data representative of objects in the physical environment that are within a field of view 130 of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Peripheral device 114 can be a keyboard, mouse, handheld controller, or any other device for use in interacting with an artificial reality system 10, 20, 30. Peripheral device 114 can include one or more emitters 208 that emit light in the visible or non-visible spectrum. In some example implementations, the peripheral device 114 can include three or more emitters 208. In some aspects, emitters 208 can be IR emitters (e.g., infrared LEDs). Emitters 208 can be arranged in a pattern (also referred to as a "constellation") that can be used by artificial reality system 10, 20 of FIGS. 1A-1C to determine a pose of the peripheral device 114. In some examples, emitters 208 are arranged on the same surface of peripheral device 114 and/or be upward facing (e.g., the top surface as shown in FIG. 2A). Peripheral device 114 can include user interface features such as keys, buttons, dials, etc. that can provide input for use by artificial reality system 10, 20, 30.

In one example, in accordance with the techniques described herein, control unit 210 is configured to, based on the sensed image data, determine a pose for a peripheral device 114. When within the field of view of the image capture devices 138, the artificial reality system can detect a pattern of active emitters 208 of peripheral device 114 within the image data and use the pattern to determine a pose of the peripheral device 114. When the peripheral device 114 is not trackable within the field of view of the image capture devices 138 or occluded within the fields of view 130A, 130B, the artificial reality system can use measurements obtained from the peripheral device 114 to determine the pose of the peripheral device 114. For example, the peripheral device 114 may be determined to be not trackable within the image data if fewer than three emitters of the peripheral device 114 are detectable in the image data. The control unit 210 can render virtual graphical representations and other artificial reality content based on the determination of the estimated pose of the peripheral device 114.

As further described herein, control unit 210 and/or console 106 controls and adjusts the pulse emission waveform of peripheral device 114 so as to align the periodic pulsing of the emitters with the exposure window of image capture devices 138, thereby ensuring that the pulses are present within image data produced by the image capture devices for use by control unit 210 and/or console 106 in determining the pose of peripheral device 112.

Figure 2B:
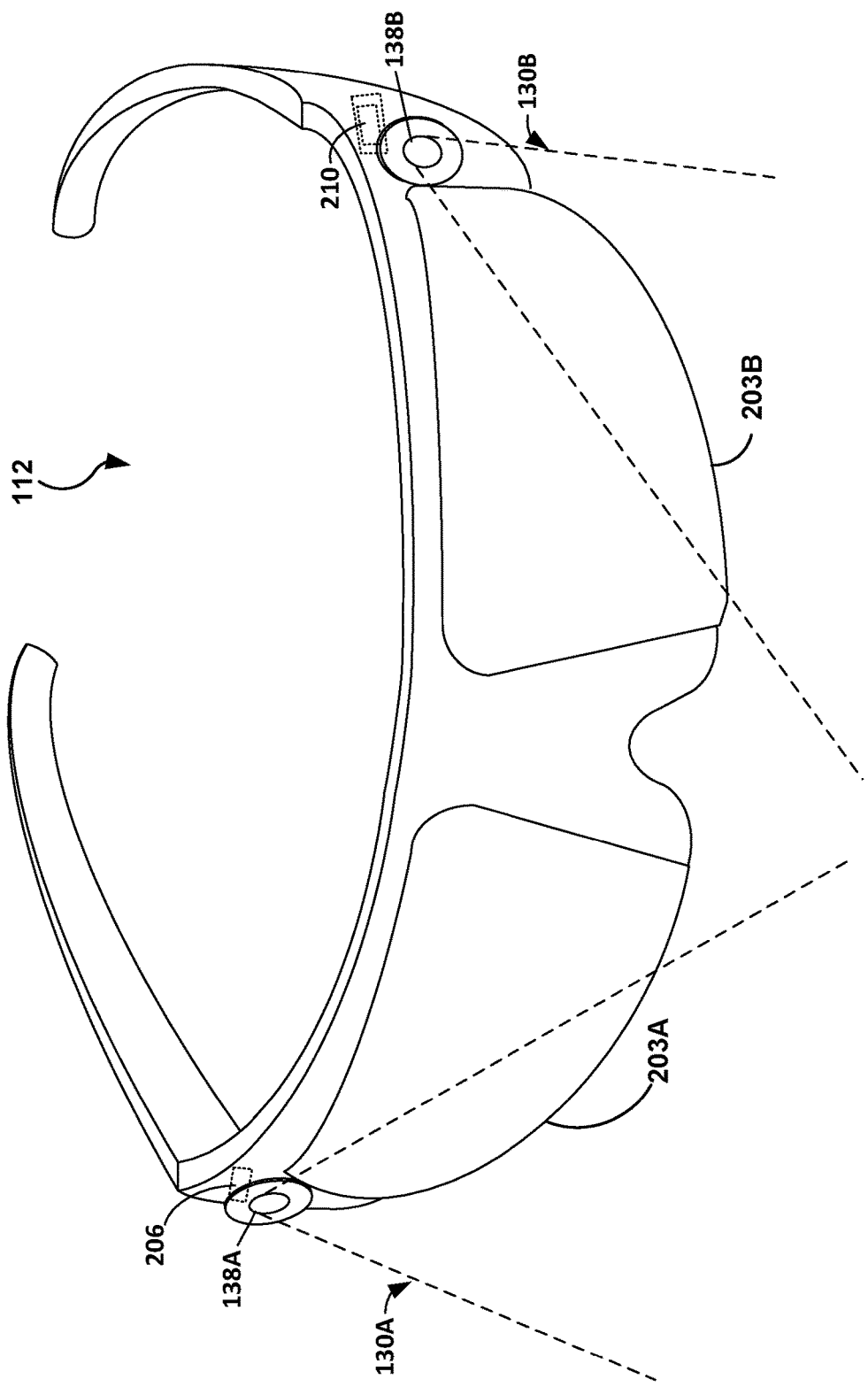
FIG. 2B is an illustration depicting an example HMD, in accordance with techniques of the disclosure.

FIG. 2B is an illustration depicting an example HMD 112, in accordance with techniques of the disclosure. As shown in FIG. 2B, HMD 112 may take the form of glasses. HMD 112 of FIG. 2A may be an example of any of HMDs 112 of FIGS. 1A-1C. HMD 112 may be part of an artificial reality system, such as artificial reality systems 10, 20 of FIGS. 1A-1C, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. In some aspects, the image capture devices 138 can capture image data from a visible spectrum and an invisible spectrum of the electromagnetic spectrum (e.g., IR light). The image capture devices 138 may include one or more image capture devices that capture image data from the visible spectrum and one or more separate image capture devices that capture image data from the invisible spectrum, or these may be combined in the same one or more image capture devices. More specifically, image capture devices 138 capture image data representative of objects in the physical environment that are within a field of view 130 of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed image data, determine a pose for a peripheral device 114. When within the field of view of the image capture devices 138, the artificial reality system can detect a pattern of active emitters 208 of peripheral device 114 within the image data and use the pattern to determine a pose of the peripheral device 114. When the peripheral device 114 is not trackable within the field of view of the image capture devices 138 or occluded within the fields of view 130A, 130B, the artificial reality system can use measurements obtained from the peripheral device 114 to determine the pose of the peripheral device 114. The control unit 210 can render virtual graphical representations and other artificial reality content based on the determination of the estimated pose of the peripheral device 114.

As further described herein, control unit 210 and/or console 106 controls and adjusts the pulse emission waveform of peripheral device 114 so as to align the periodic pulsing of the emitters with the exposure window of image capture devices 138, thereby ensuring that the pulses are present within image data produced by the image capture devices for use by control unit 210 and/or console 106 in determining the pose of peripheral device 112.

Figure 3:
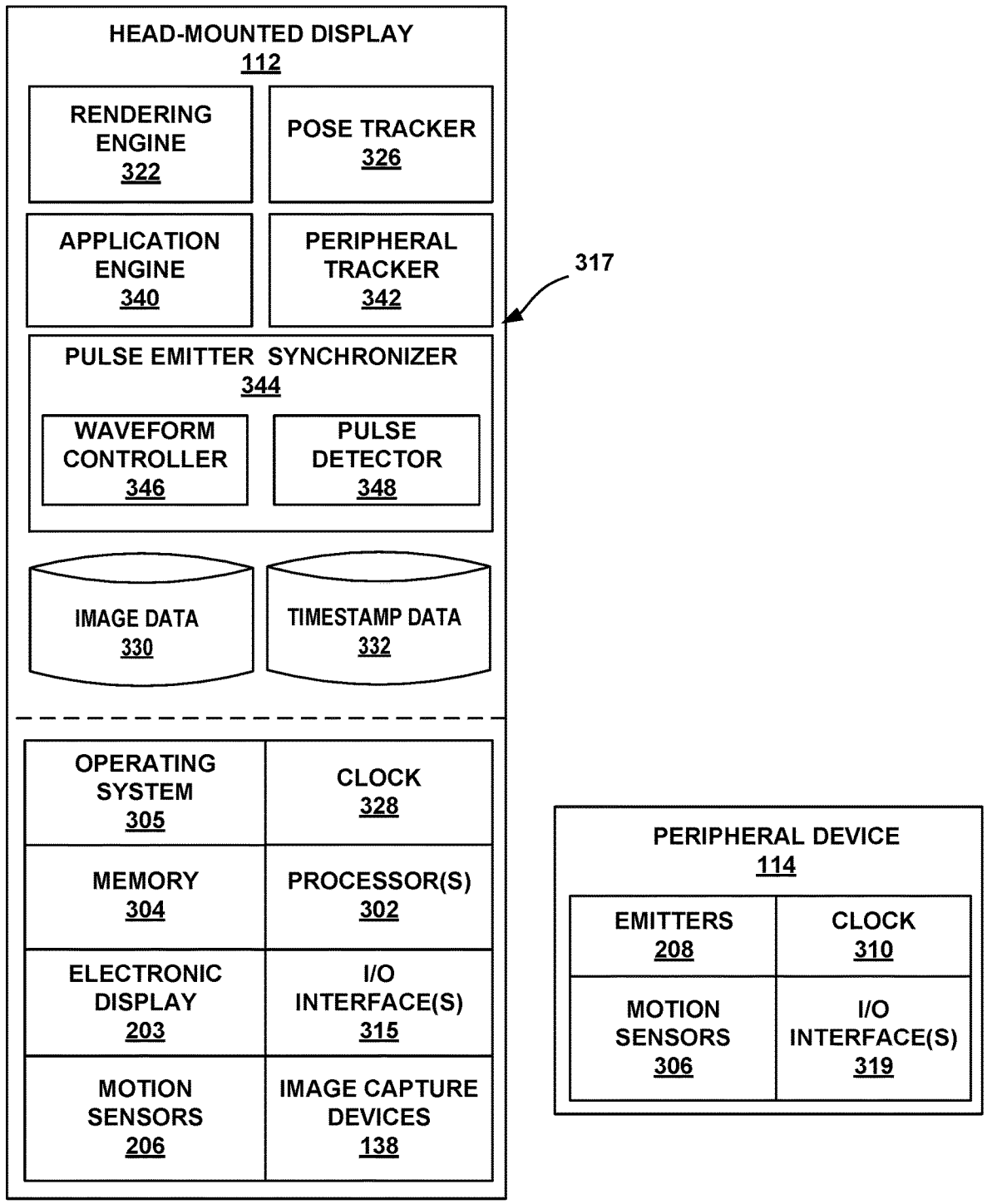
FIG. 3 is a block diagram depicting an example in which pose tracking for a peripheral device is performed by an example instance of the HMD of the artificial reality systems of FIGS. 1A, 1B in accordance with the techniques of the disclosure.

FIG. 3 is a block diagram showing an example in which pose tracking for one or more peripheral devices 114 is performed by an example instance of artificial reality systems 10, 20 of FIGS. 1A-1C. In the example of FIG. 3, HMD 112 performs pose tracking and rendering for HMD 112 and peripheral device 114 in accordance with the techniques described herein based on sensed data, such image data 330 captured by image capture devices 138.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with peripheral device 114 via similar I/O interfaces 319 and other devices such as display devices, image capture devices, other HMDs, and the like. Moreover, the one or more I/O interfaces 315, 319 may include one or more wired or wireless network interface controllers (NICs) for communicating with a network, such as network 104. In some examples, the one or more I/O interfaces 315 use a wireless protocol to communicate with peripheral device 114 (e.g., Bluetooth, Bluetooth Low Energy (BLE), Wi-Fi). Additionally, processor(s) 302 are coupled to electronic display 203, motion sensors 206, image capture devices 138, and clock 328. In some examples, processors 302 and memory 304 may be separate, discrete components. In other examples, memory 304 may be on-chip memory collocated with processors 302 within a single integrated circuit.

In some examples, one or more image capture devices 138 are configured to obtain image data 330 (e.g., image frames) during a small exposure period of time of a frame period (e.g., the duration of time between the start of each exposure). For example, the exposure period can often be on the order of several microseconds (e.g., 30 to 45 microseconds) while the frame period can hundreds or thousands of microseconds (e.g., 100 to 50000 microseconds). In some examples, the frame period can be shorter than 100 microseconds. HMD 112 may process the captured image frame during the same frame period that it was captured (e.g., after the exposure window of the current image frame and before the exposure window of the next image frame).

Software applications 317 of HMD 112 operate to provide an overall artificial reality application. In this example, software applications 317 include rendering engine 322, application engine 340, pose tracker 326, peripheral tracker 342, pulse emitter synchronizer 346, image data 330, and timestamp data 332.

In general, application engine 340 includes functionality to provide and present an artificial reality application, e.g., a workspace (workstation) application, a teleconference application, a gaming application, a navigation application, an educational application, training or simulation applications, and the like. Application engine 340 may include, for example, one or more software packages, software libraries, hardware drivers, and/or Application Programming Interfaces (APIs) for implementing an artificial reality application on HMD 112. Responsive to control by application engine 340, rendering engine 322 generates 3D artificial reality content for display to the user by application engine 340 of HMD 112.

Application engine 340 and rendering engine 322 construct the artificial content for display to user 110 in accordance with current pose information for HMD 112 within a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112 and user commands, and, in some examples, data from any external sensors 90 (FIGS. 1A-1C), such as external cameras, to capture 3D information within the real world environment, such as motion by user 110, and/or feature tracking information with respect to user 110.

Peripheral tracker 342 determines current pose information (e.g., current location and orientation) for peripheral device 114 based on the location of active emitters 208 in image data 330 (e.g., image frames) in accordance with the frame of reference of HMD 112. Pulse emitter synchronizer 344 configures and controls the pulsing waveform (timing and period) of the pulsing pattern produced by emitters 208 to ensure that the pulsing of emitters 208 falls within the small exposure window of image capture devices 138. In some examples, pulse emitter synchronizer 344 performs a visual search through image data 330 to identify visual indicators (pulses) received from active emitters 208 to synchronize the timing of light pulses produced by pulse emitters 208 on peripheral device 114 with exposure windows of the image capture devices 138. In another example, pulse emitter synchronizer 344 may utilize timestamp data 332 to determine a pulsing waveform that aligns the light pulses produced by emitters 208 of peripheral device 114 with the exposure windows of image capture device 138 of HMD 112. For example, pulse emitter synchronizer 344 may periodically obtain and store timestamps from clock 310 of peripheral device 114 via I/O interface(s) 315 and corresponding timestamps from clock 328 of HMD 112, and use that timestamp data 332 to synchronize the timing of light pulses produced by pulse emitters 208 on peripheral device 114 with exposure windows of the image capture devices 138. In another example, pulse emitter synchronizer 344 may use the timestamp data 332 to form an initial estimate of clock alignment so as to narrow a search space for a visual search through image data 330—resulting in faster clock compensation. Either way, pulse emitter synchronizer 344 helps ensure that emitters 208 pulse (e.g., are active) within the exposure (capture) window of image capture devices 138 to enable peripheral tracker 342 to track peripheral device 114 using emitters 208. These techniques may be beneficial where only limited information can be directly exchanged between HMD 112 and peripheral device 114, such as where peripheral device 114 is a third-party device.

Pulse emitter synchronizer 344 includes waveform controller 346 and pulse detector 348. Waveform controller 346 programs the pulse waveform for emitters 208 of peripheral device 114. For example, waveform controller 346 instructs, via I/O interface(s) 315 (e.g., over a wireless protocol, such as Bluetooth, BLE, or Wi-Fi), peripheral device 114 to pulse emitters 208 based on pulse waveform parameters, including when peripheral device 114 will begin pulsing emitters 208, how long peripheral device 114 will pulse emitters 208 (e.g., the duration in which they remain active), and how long peripheral device 114 will keep emitters 208 off (e.g., the duration in which they remain inactive) in between pulses. Waveform controller 346 also reprograms peripheral device 114 to offset the emitter waveform in time when necessary to help ensure that timing of emitter pulses fall within the small exposure windows of image capture devices 138. For example, when pulse emitter synchronizer 342 is performing a visual search, waveform controller 346 may offset when peripheral device 114 pulses emitters 208 until the timing of emitter 208 pulses fall within the small exposure (capture) window of image capture devices 138.

Pulse detector 348 determines whether the pulses (e.g., IF pulses) of emitters 208 are detected in image data 330. For example, pulse detector 348 analysis individual image frames captured by image capture devices 138 to determine whether one or more emitters 208 are active in the image frame. In some examples, pulse detectors 348 determines that emitters 208 are detected in a captured image frame when it detects three or more active emitters 208 in the image frame. In some examples, pulse detector 348 determines whether emitters 208 are detected in an image frame before the next image frame is captured by image capture devices 138. Further details on the operation of pulse emitter synchronizer 344, waveform controller 346, and pulse detector 348 are provided below.

Peripheral device 114 can be a keyboard, mouse, controller, or any other device that provides for user interaction with artificial reality systems 10, 20 of FIGS. 1A-1C. In some aspects, peripheral device 114 includes emitters 208, motion sensors 306, clock 310, and I/O interface 319. Emitters 208 can emit and/or reflect light within the visible or non-visible spectrum. In some examples, emitters 208 can emit light in the infrared (IR) spectrum. For example, emitters 208 can be infrared LED lights. In some examples, peripheral device 117 pulses emitters 208 based on pulse waveform parameters/information received from HMD 112 at I/O interface(s) 319. In some examples, the pulse waveform parameters received from HMD 112 is in the time domain of clock 310. In accordance with the techniques described herein, peripheral device 114 is configured to include emitters 208 arranged in a predetermined pattern on a surface of peripheral device 114 so that peripheral tracker 342 can detect the pattern of light (e.g., IR light) from the emitters 208 of peripheral device 114 within image data 330 (e.g., within a current image frame) and use the pattern to determine a current pose of the peripheral device 114.

Motion sensors 206, can include sensors such as one or more accelerometers (also referred to as inertial measurement units or "IMUs") that output data indicative of current acceleration of peripheral device 114, GPS sensors that output data indicative of a location of peripheral device 114, radar or sonar that output data indicative of distances of peripheral device 114 from various objects, or other sensors that provide indications of a location or orientation of peripheral device 114 or other objects within a physical environment. In some examples, the output data of sensors 206 can be used to determine a current pose of peripheral device 114 (e.g., when the peripheral device is not within the filed of view of image capture devices 138).

Figure 4:
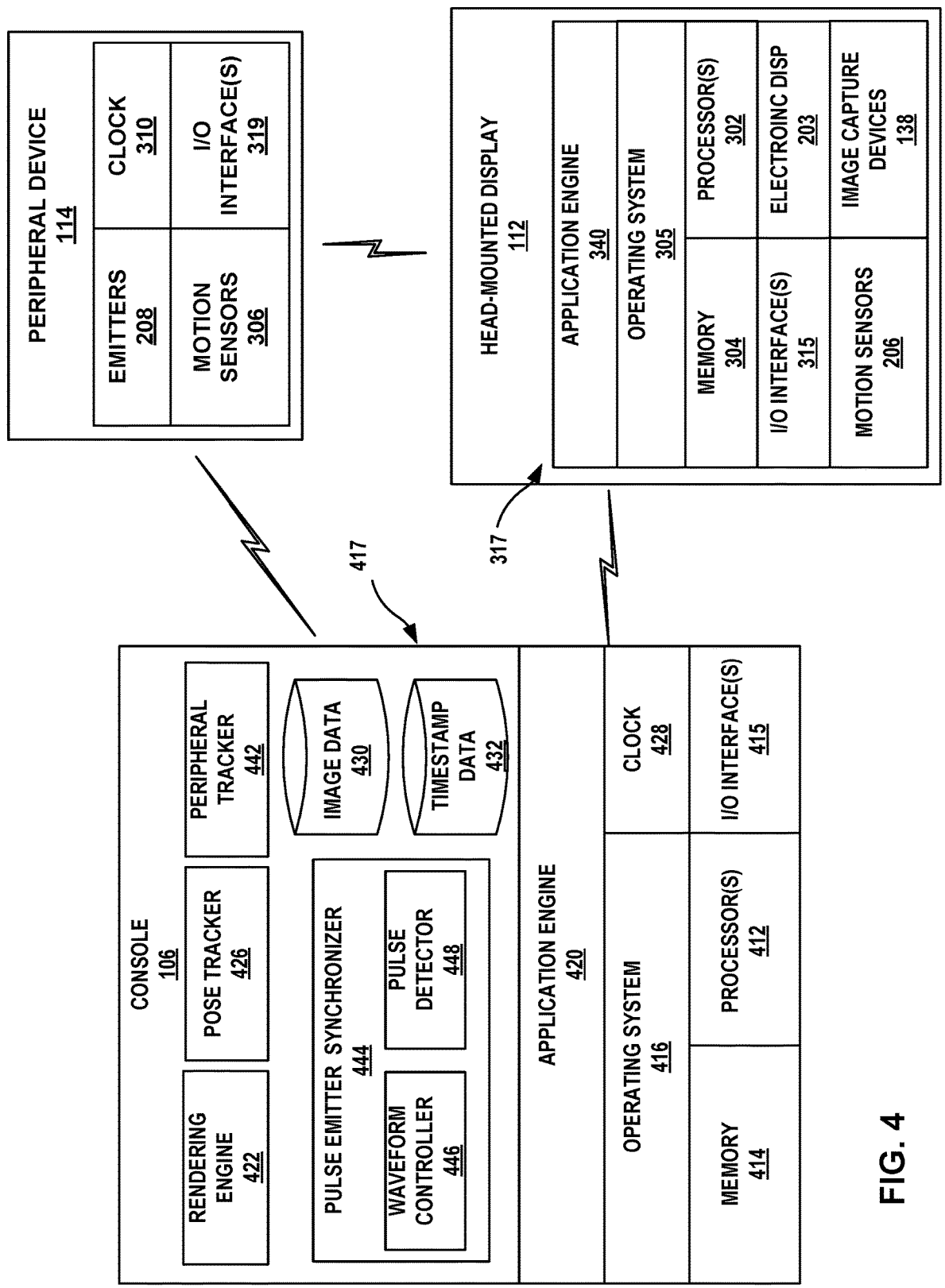
FIG. 4 is a block diagram showing example implementations in which pose tracking for a peripheral device is performed by example instances of the console and the HMD of the artificial reality systems of FIGS. 1A, 1B, in accordance with the techniques of the disclosure.

FIG. 4 is a block diagram showing example implementations in which pose tracking for a peripheral device is performed by example instances of console 106 and HMD 112 of artificial reality system 10, 20 of FIGS. 1A-1C. In the example of FIG. 4, console 106 performs pose tracking and rendering for HMD 112 in accordance with the techniques described herein based on sensed data, such as image data 430 received from HMD 112 and/or external sensors.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, and image capture devices 138.

In general, console 106 is a computing device that processes image and tracking information received from HMD 112, and measurement data from peripheral device 114 to perform pulse emitter synchronization, pose tracking, and content rendering for HMD 112 and peripheral device 114. In some examples, console 106 is a single computing device, such as a workstation, a desktop computer, a laptop, or gaming system. In some examples, at least a portion of console 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as a keyboard, a mouse, game controllers, display devices, image capture devices, HMDs, and the like. Moreover, the one or more I/O interfaces 415 may include one or more wired or wireless network interface controllers (NICs) for communicating with a network, such as network 104. In some examples, the one or more I/O interfaces 415 use a wireless protocol to communicate with peripheral device 114 (e.g., Bluetooth, Bluetooth Low Energy (BLE), Wi-Fi). Each of processors 302, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of console 106 operate to provide an overall artificial reality application. In this example, software applications 417 include application engine 420, rendering engine 422, and pose tracker 426.

In general, application engine 420 includes functionality to provide and present an artificial reality application, e.g., a workspace (workstation) application, a teleconference application, a gaming application, a navigation application, an educational application, training or simulation applications, and the like. Application engine 420 may include, for example, one or more software packages, software libraries, hardware drivers, and/or Application Program Interfaces (APIs) for implementing an artificial reality application on console 106. Responsive to control by application engine 420, rendering engine 422 generates 3D artificial reality content for display to the user by application engine 340 of HMD 112.

Application engine 420 and rendering engine 422 construct the artificial content for display to user 110 in accordance with current pose information for HMD 112 and peripheral device 114 within a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112, such as image data 430 from sensors on HMD 112, and, in some examples, data from any external sensors 90 (FIGS. 1A, 1B, 1C), such as external cameras, to capture 3D information within the real world environment, such as motion by user 110 and/or feature tracking information with respect to user 110. Based on the sensed data, console 106 constructs the artificial reality content for communication, via the one or more I/O interfaces 315, 415, to HMD 112 for display to user 110.

Peripheral tracker 442 determines current pose information (e.g., current location and orientation) for peripheral device 114 based on the location of active emitters 208 in image data 430 (e.g., image frames) in accordance with the frame of reference of HMD 112. Pulse emitter synchronizer 444 configures and controls the pulsing waveform (timing and period) of the pulsing pattern produced by emitters 208 to ensure that the pulsing of emitters 208 falls within the small exposure window of image capture devices 138.

Similar to pulse emitter synchronizer 344 described above with respect to FIG. 3, pulse emitter synchronizer 444 includes waveform controller 346 and pulse detector 348. Waveform controller 446 programs the pulse waveform for emitters 208 of peripheral device 114. For example, waveform controller 446 communicates, via I/O interface(s) 415 (e.g., over a wireless protocol, such as Bluetooth, BLE, or Wi-Fi), to peripheral device 114, pulse waveform parameters including when peripheral device 114 will begin pulsing emitters 208, how long peripheral device 114 will pulse emitters 208 (e.g., the duration in which they remain active), and how long peripheral device 114 will keep emitters 208 off (e.g., the duration in which they remain inactive) in between pulses. Waveform controller 446 also reprograms peripheral device 114 to offset the emitter waveform in time when necessary to help ensure that timing of emitter pulses fall within the small exposure window of image capture devices 138. For example, when pulse emitter synchronizer 442 is performing a visual search, waveform controller 446 may offset when peripheral device 114 pulses emitters 208 until the timing of emitter 208 pulses fall within the small exposure (capture) window of image capture devices 138.

Pulse detector 448 determines whether the pulses (e.g., IF pulses) of emitters 208 are detected in image data 330. For example, pulse detector 448 analysis individual image frames captured by image capture devices 138 to determine whether one or more emitters 208 are active in an image frame. In some examples, pulse detectors 448 determines that emitters 208 are detected in a captured image frame when it detects three or more active emitters 208 in the image frame. In some examples, pulse detector 448 determines whether emitters 208 are detected in an image frame before the next image frame is captured by image capture devices 138. Further example details on the operation of pulse emitter synchronizer 444, waveform controller 446, and pulse detector 448 are provided below with respect to FIGS. 5-10.

Figure 5:
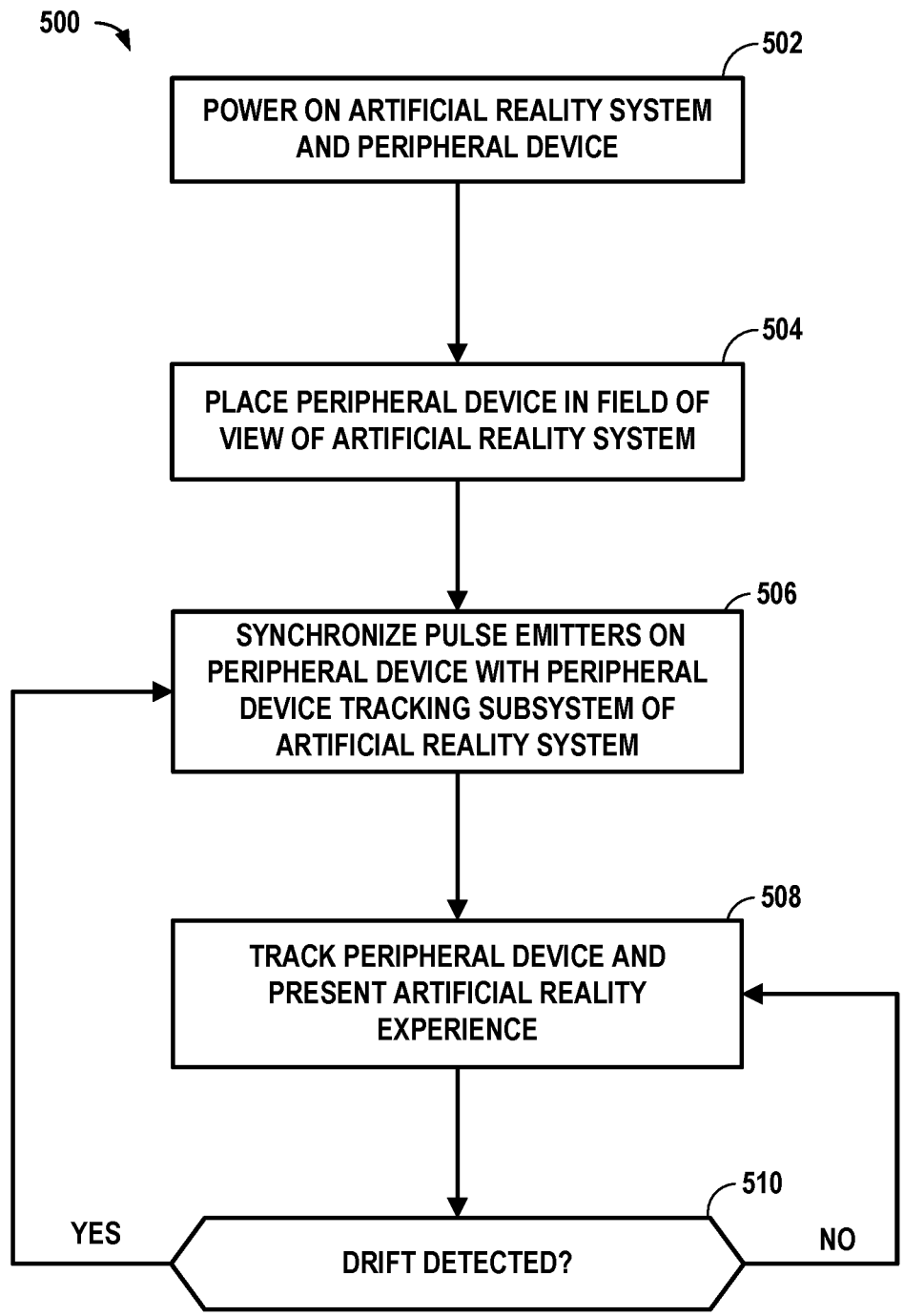
FIG. 5 is a flowchart illustrating example operations of a method for tracking a peripheral device in accordance with aspects of the disclosure.

FIG. 5 is a flowchart 500 illustrating example operations of an artificial reality system tracking a peripheral device and, in particular, aligning the light emission wave pattern of the peripheral device and the exposure window of the image capture components of the artificial reality system, in accordance with aspects of the disclosure. First, an artificial reality (AR) system (e.g., artificial reality systems 10, 20 of FIGS. 1A-1C) and peripheral device 114 are powered on (502). It is understood that the AR system and peripheral device 114 need not be powered on at the same time. For example, the AR system may be powered on first and the peripheral device 114 second (or vise versa). In some examples, a communications link is established between I/O interface(s) 315 (or 415) and I/O interface(s) 319 when both the AR system and the peripheral device 114 are powered on (e.g., a Bluetooth, Bluetooth Low Energy (BLE), Wi-Fi, or any other wireless communication link).

Next, user 110 places peripheral device 114 within the field of view 130 of the AR system (504). For example, user 110 may place peripheral device 114 within field of view 130 of image capturing devices 138 of HMD 112. In some examples, when the AR system is powered on first HMD 112 of the AR system may prompt user 110 to place peripheral device 114 within the viewing perspective of HMD 112, which usually corresponds to field of view 130 (e.g., in response to the AR system and peripheral device being powered on and/or in response to establishing the communications link between I/O interface(s) 315 (or 415) and I/O interface(s) 319).

Once peripheral device 114 is within the field of view 130 of the AR system, the AR system (e.g., pulse emitter synchronizer 344 or 444) synchronizes timing of light pulses produced by pulse emitters 208 on peripheral device 114 with exposure windows of the image capture components of the peripheral tracking subsystem of the AR system (e.g., peripheral tracker 342 or 442) (506). For example, as described herein, pulse emitter synchronizer 344 or 444 may perform a visual search, use timestamp data 332 (e.g., timestamp pairs from clocks 328 (or 428) and clock 310), or use timestamp data 332 in conjunction with a visual search to synchronize pulse emitters 208 on peripheral device 114 with the peripheral tracking subsystem of the AR system (e.g., peripheral tracker 342 or 442), as described in further detail below.

After the timing of light pulses produced by pulse emitters 208 on peripheral device 114 are synchronized with exposure windows of the image capture components of the peripheral tracking sub-system of the AR system, the AR system tracks peripheral device 114 and present an artificial reality experience (e.g., render and present artificial reality content 122) (508). For example, peripheral tracker 342 or 442 tracks peripheral device 114 by detecting a pattern of active emitters 208 of peripheral device 114 within image data 330 or 440 (e.g., image frames) and use that pattern to determine a pose of the peripheral device 114 at every image frame in which peripheral device 114 is in the field of view 130 of image capture devices 138. The AR system renders and presents an AR workspace (e.g., workstation) application including one or more virtual application windows 128, with which user 110 may interact with using peripheral device 114 (e.g., as shown in FIGS. 1A-1C).

Next, the AR system may determine whether drift is detected. Because clocks 328 (or 428) and 310 may be misaligned or go out of synch over time (drift), the pulsing of emitters 208 may fall outside the exposure window of image capture devices 138 and peripheral tracker 342 or 442 may be unable to track peripheral device 114. In some examples, the AR system (e.g., pose tracker 326 or 426, pulse detector 348 or 448) may detect drift when the intensity of the pulse of emitters 208 is below a pulse threshold (e.g., 50% maximum intensity or any other value). In some examples, the AR system (e.g., pose tracker 326 or 426, pulse detector 348 or 448) may detect drift when the pulse from emitters 208 is not detected in captured image data 330 even when emitters 208 are in field of view 130 of the image capture devices 138. In some examples, the AR system may automatically "detect" drift after a predetermined threshold period of time (e.g., every 200 to 600 milliseconds or any other period of time). In other words, the AR system may automatically trigger drift correction every time the predetermined threshold period of time has passed (e.g., follow YES branch of 510 every time the predetermined threshold period of time has passed).

In response to determining that drift is detected (YES branch of 510), the AR system (e.g., pulse emitter synchronizer 344 or 444) may resynchronize pulse emitters 208 on peripheral device 114 with the peripheral tracking subsystem of the AR system (e.g., peripheral tracker 342 or 442) with any of the techniques described herein (e.g., return to 506). In response to determining that drift is not detected (NO branch of 510), the AR system may track peripheral device 114 and present an artificial reality experience (e.g., render and present artificial reality content 122) (508).

Figure 6:
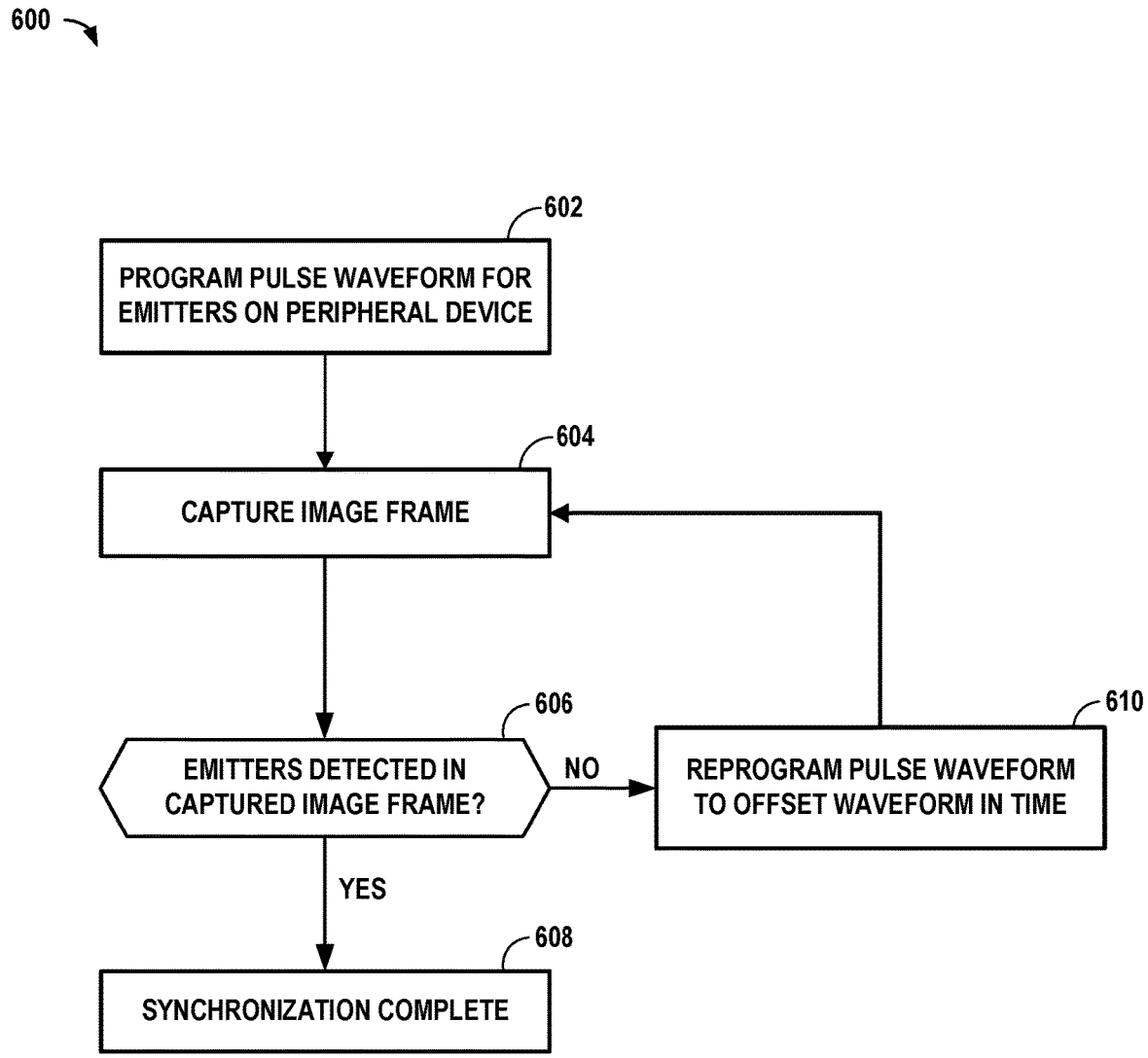
FIG. 6 is a flowchart illustrating example linear visual search operations for synchronizing pulse emitters on a peripheral device in accordance with the techniques of the disclosure.

FIG. 6 is a flowchart 600 illustrating example linear visual search operations for synchronizing emitters 208 on peripheral device 114 in accordance with the techniques of the disclosure. Flowchart 600 is one example of the functions performed by pulse emitter synchronizer 344 or 444 (step 508 of flowchart 500 in FIG. 5) to ensure emitters 208 are pulsed at least in part during the small exposure period in which image capture devices 138 obtain image data 330 or 430 (e.g., image frames).

Initially, waveform controller 346 or 446 programs emitters 208 on peripheral device 114 to pulse according to a periodic waveform where the period of the waveform matches the time duration for capturing a single image frame, thereby ensuring there is a single pulse per image capture frame (602). For example, waveform controller 346 or 446 instructs, via I/O interface(s) 315 or 415 (e.g., over a wireless protocol, such as Bluetooth, BLE, or Wi-Fi), peripheral device 114 to pulse emitters 208 based on pulse waveform parameters, including when peripheral device 114 will begin pulsing emitters 208 (e.g., a start time), the duration of time emitters 208 should be active (e.g., active duration), and the duration of time emitters 203 should be inactive (e.g., inactive duration). In some examples, the start time may correspond to the time the peripheral time received the instruction (e.g., the instruction can be for the peripheral device 114 to immediately begin pulsing emitters 203). In some examples, the start time may be any future time within the peripheral device's time domain. For example, to determine a future start time within the peripheral device's time domain, pulse emitter synchronizer 444 may request current time information (e.g., a current timestamp) from peripheral device 114 and set the start time in the waveform parameters to the received time information plus an additional amount of time or delay (e.g., the exposure duration, the frame period, or any other additional amount of time). In another example, the future start time may be determined as described below with reference to FIGS. 10A-10B.

In some examples, the active duration for emitters 208 can be equal to the exposure period of time of the one or more image capture devices 138, about half the exposure period of time of the one or more image capture devices 138, twice the ideal overlap between the emitters being active and an exposure, or any other period of time. In some example, the inactive duration for emitters 203 can be equal to the frame period minus active duration of a pulse. In this way, the period of the emitter waveform will be the same as the frame period of the one or more image capture devices 138.

Once peripheral device 114 starts pulsing emitters 208 according to the waveform parameters, the one or more image capture devices 138 capture an image frame (e.g. image data 330 or 430) (604). Next, pulse detector 348 or 448 determines whether the pulse (e.g., IF light) of emitters 208 is detected in the captured image frame (606). In response to pulse detector 348 or 448 determining that the pulse (e.g., IF light) of emitters 208 is detected in the captured image frame (YES branch of 606), the synchronization of emitters 208 on peripheral device 114 with peripheral tracker 342 or 442 is complete (608) (e.g., flowchart 500 may continue to 510 in FIG. 5).

In response to pulse detector 348 or 448 determining that the pulse (e.g., IF light) of emitters 208 is not detected in the captured image frame (NO branch of 606), waveform controller 346 or 446 reprograms the pulse waveform for emitters 208 on peripheral device 114 to offset (shift) the pulse waveform in time by a small amount that is less than the exposure window (610). For example, waveform controller 346 or 446 may update the waveform parameters by introducing an offset or delta to the start of the next (or any subsequent) pulse of emitters 208 (e.g., shifting the next pulse waveform to the left or right in time) and instructs, via I/O interface(s) 315 or 415 (e.g., over a wireless protocol, such as Bluetooth, BLE, or Wi-Fi), peripheral device 114 to pulse emitters 208 based on the updated waveform parameters. In some examples, the offset or delta introduced at 610 may be equal to exposure period of time of the one or more image capture devices 138. Repeatedly introducing the offset or delta after every image frame in which pulse detector 348 or 448 does not detect the pulse (e.g., IF light) of emitters 208 will shift the pulse waveform linearly until the pulse is detected in a captured image frame (YES branch of 606).

In some examples, pulse detector 348 or 448 may determine that the pulse (e.g., IF light) of emitters 208 is not detected in the captured image frame (NO branch of 606) when the intensity of the pulse of emitters 208 within the image frame is below a pulse threshold (e.g., 50% maximum intensity or any other value). In other examples, pulse detector 348 or 448 may determine that the pulse (e.g., IF light) of emitters 208 is not detected in the captured image frame (NO branch of 606) when no pulse of emitters 208 is detected within the current image frame.

Figure 7:
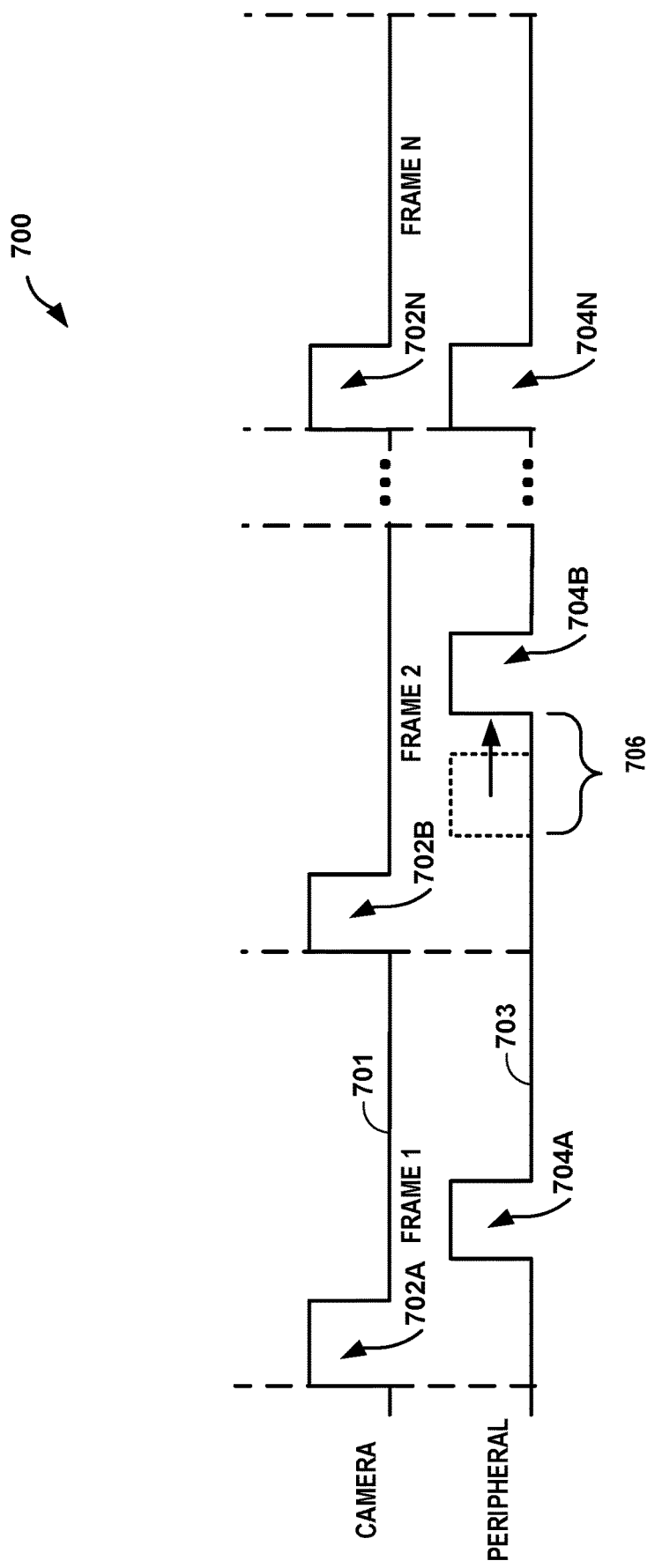
FIG. 7 are waveforms illustrating linear visual search operations for synchronizing pulse emitters on a peripheral device in accordance with the techniques of the disclosure.

FIG. 7 are example waveforms 700 illustrating linear visual search operations (FIG. 6) for synchronizing pulse emitters 208 on a peripheral device 114 with a peripheral device tracking subsystem in accordance with the techniques of the disclosure.

For example, waveform 701 is the exposure waveform for the one or more image capture devices 138 and waveform 703 is the pulse waveform for emitters 208. In this example, exposures 702A, 702B, and 704N correspond to step 604 of FIG. 6 that captures an image frame. Specifically, FIG. 7 shows that pulse 704A of emitters 208 does not occur during the exposure 702A of FRAME 1 (or the first image frame). In this case, pulse detector 348 or 448 would determine that pulse 704A of emitters 208 is not detected in the first captured image frame (NO branch of 606), and waveform controller 346 or 446 would reprogram pulse waveform 703 to offset the waveform in time (610). As shown in FIG. 7, waveform controller 346 or 446 may reprogram pulse waveform 703 by shifting (e.g., delaying) pulse 704B by offset (or delta) 706, which may be equal to period of time for exposure 702B (e.g., the exposure period for the one or more image capture devices 138) or any other period of time. In some examples, waveform controller 346 or 446 would reprogram pulse waveform 703 (e.g., perform 610 of FIG. 6) before exposure 702B (which can correspond to 604 of FIG. 6).

FIG. 7 shows that pulse 704B of emitters 208 again does not occur during exposure 702B of Frame 2 (e.g., the second image frame). Again, pulse detector 348 or 448 would determine that pulse 704B of emitters 208 is not detected in FRAME 2 (the second captured image frame) (NO branch of 606), and waveform controller 346 or 446 would again reprogram pulse waveform 703 to offset the waveform in time (610).

As described above with reference to FIG. 6, waveform controller 346 or 446 will continue to introduce offset or delta 706 after every image frame in which pulse detector 348 or 448 does not detect the pulse (e.g., IF light) of emitters 208 until the pulse is detected in a captured image frame (YES branch of 606). For example, FIG. 7 shows pulse 704N occurring during exposure 702N of Frame N (e.g., the Nth image frame). Here, pulse detector 348 or 448 would determine that pulse 704N of emitters 208 is detected in FRAME N (the Nth captured image frame) (YES branch of 606), and the synchronization of emitters 208 on peripheral device 114 with peripheral tracker 342 or 442 would be complete (608). In some examples, offset (or delta) 706 may be the same duration of time or the duration can vary between captured image frame (e.g., as described below with reference to FIG. 8).

Figure 8:
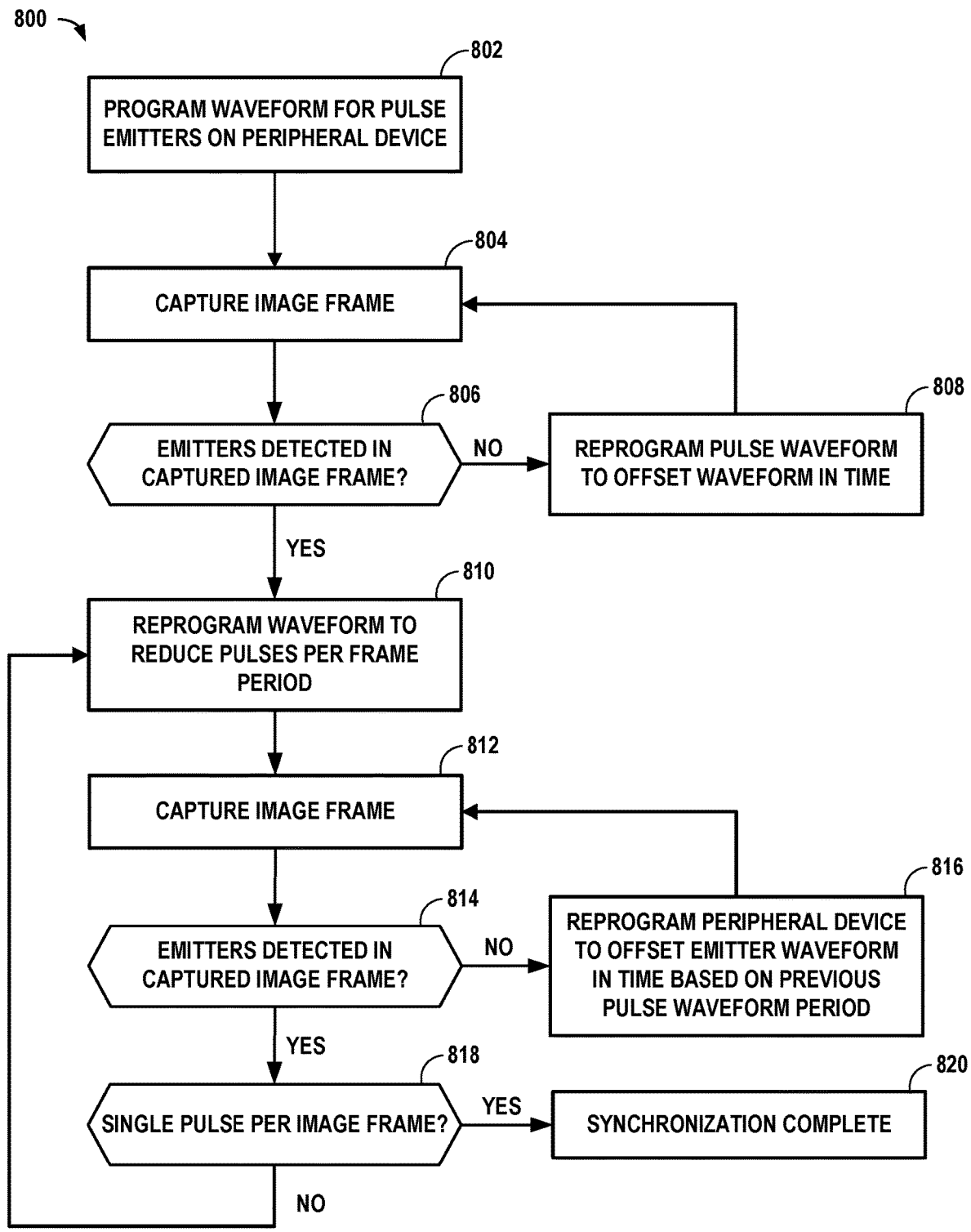
FIG. 8 is a flowchart illustrating example prime factor visual search operations for synchronizing pulse emitters on a peripheral device in accordance with the techniques of the disclosure.

FIG. 8 is a flowchart 800 illustrating example improved visual search operations (prime factor visual search, in this example) for synchronizing pulse emitters 208 on a peripheral device 114 in accordance with the techniques of the disclosure. Flowchart 800 is another example of the functions performed in 508 of flowchart 500 in FIG. 5 to help ensure emitters 208 are pulsed at least in part during the small exposure period in which image capture devices 138 obtain image data 330 or 430 (e.g., image frames).

Waveform controller 346 or 446 programs the pulse waveform for emitters 208 on peripheral device 114 (802). For example, waveform controller 346 or 446 instructs, via I/O interface(s) 315 or 415 (e.g., over a wireless protocol, such as Bluetooth, BLE, or Wi-Fi), peripheral device 114 to pulse emitters 208 based on waveform parameters, including when peripheral device 114 will begin pulsing emitters 208 (e.g., a start time), the duration of time emitters 208 should be active (e.g., active duration), and the duration of time emitters 203 should be inactive (e.g., inactive duration).

In some examples, the start time may correspond to the time peripheral device 114 received the instruction (e.g., the instruction can be for peripheral device 114 to immediately begin pulsing emitters 203). In some examples, the start time may be any future time within the peripheral device's time domain. For example, to determine a future start time within the peripheral device's time domain, pulse emitter synchronizer 444 may request current time information (e.g., a current timestamp) from peripheral device 114 and set the start time in the waveform parameters to the received time information plus an additional amount of time or delay (e.g., the exposure duration, the frame period 906 of FIG. 9A, or any other additional amount of time). In another example, the future start time may be determined as described below with reference to FIGS. 10A-10B.

In some examples, the active duration for emitters 208 can be equal to the exposure period of time of the one or more image capture devices 138, about half the exposure period of time of the one or more image capture devices 138 (e.g., about half the duration of exposure 902A of FIG. 9A), twice the ideal overlap between the emitters being active and an exposure, or any other period of time.

Figure 9D:
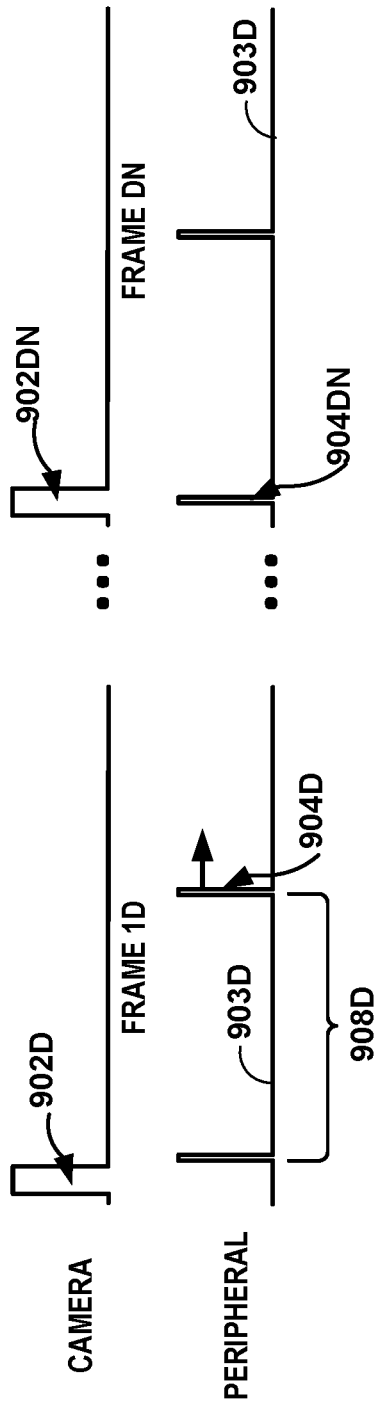
Figure 9E:
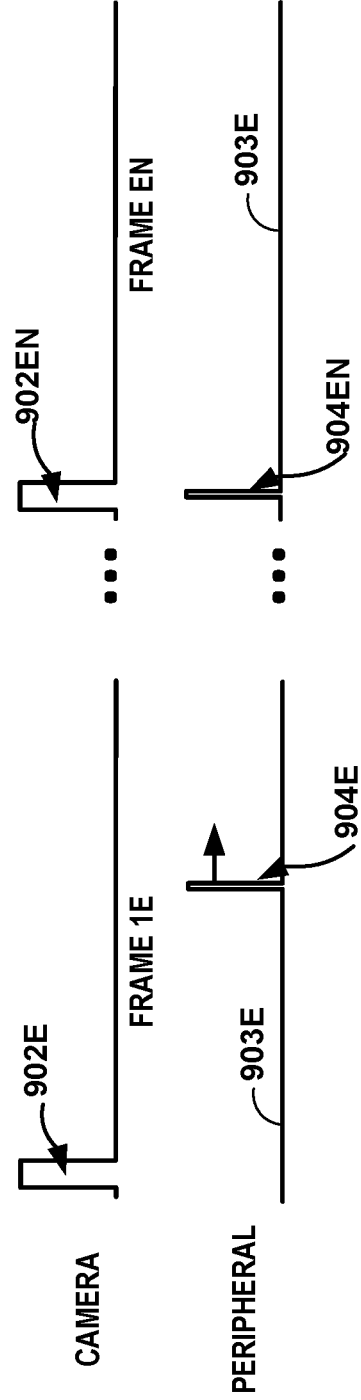

In some examples, the inactive duration for emitters 203 may be shorter than the frame period 906 of image capture devices 138 such that emitters 208 pulse two or more times in between exposures for faster clock synchronization (e.g., flowchart 600 of FIG. 6), as shown in FIGS. 9A-9D. For example, a frame period can be 40000 microseconds (e.g., frame period 906 of FIG. 9A) and waveform controller 346 or 446 can set the pulse waveform period for the pulses (e.g., pulse waveform period 908A if FIG. 9A) to be 200 microseconds such that the emitters are active for 40 microseconds and inactive for 160 microseconds. In this way, emitters 208 will pulse about 200 times in one image frame period (e.g., frame period 906 if FIG. 9A). For simplicity, FIG. 9A shows a plurality of pulses 904A of pulse waveform 903A within one frame period 906 of exposure waveform 901. Specifically, FIG. 9A shows ten pulses 904A (e.g., shown in two sets of five) in the frame period 906 corresponding to FRAME 1A.

Once peripheral device 114 starts pulsing emitters 208 according to the waveform parameters, the one or more image capture devices 138 capture an image frame (e.g. image data 330 or 430) (804). Next, pulse detector 348 or 448 determines whether a pulse (e.g., IF light) of emitters 208 is detected in the captured image frame (806). In response to pulse detector 348 or 448 determining that a pulse (e.g., IF light) of emitters 208 is not detected in the captured image frame (NO branch of 806), waveform controller 346 or 446 reprograms the pulse waveform for emitters 208 on peripheral device 114 to offset the pulse waveform in time (808). For example, waveform controller 346 or 446 may update the waveform parameters by introducing an offset or delta to the pulse waveform (e.g., shifting the pulse waveform to the left or right in time) and instruct, via I/O interface(s) 315 or 415 (e.g., over a wireless protocol, such as Bluetooth, BLE, or Wi-Fi), peripheral device 114 to pulse emitters 208 based on the updated waveform parameters. In some examples, the offset or delta introduced at 808 may be equal to exposure period of time of the one or more image capture devices 138.

Introducing the offset or delta after every captured image frame in which pulse detector 348 or 448 does not detect a pulse (e.g., IF light) of emitters 208 will shift the pulse waveform linearly until the pulse is detected in a captured image frame (YES branch of 806). For example, in FIG. 9A a pulse 904A does not overlap with exposure 902A in FRAME 1A, which would result in pulse detector 348 or 448 determining that a pulse of emitters 208 is not detected in FRAME 1A (NO branch of 806), and waveform controller 346 or 446 would reprogram pulse waveform 903A to offset waveform 903A in time (808) to help ensure that a pulse is detected in a captured image frame (e.g., as shown in FRAME AN of FIG. 9A). In should be understood that an offset or delta may have been introduced one or more times between FRAME 1A and AN of FIG. 9A. For example, with a 200-microsecond pulse waveform and a 40000-microsecond frame period, pulse emitter synchronizer 344 or 444 would only take up to five linear search steps to help ensure that a pulse 904AN at least partially overlaps with exposure 902AN. These intermediate steps are not shown in FIG. 9A for simplicity.

In some examples, pulse detector 348 or 448 may determine that a pulse (e.g., IF light) of emitters 208 is not detected in the captured image frame (NO branch of 806) when the intensity of the pulse of emitters 208 within the image frame is below a pulse threshold (e.g., 50% maximum intensity or any other value). In other examples, pulse detector 348 or 448 may determine that the pulse (e.g., IF light) of emitters 208 is not detected in the captured image frame (NO branch of 806) when no pulse of emitters 208 is detected within the image frame.

In response to pulse detector 348 or 448 determining that a pulse (e.g., IF light) of emitters 208 is detected in a captured image frame (YES branch of 806) (e.g., a pulse 904AN at least partially overlaps with exposure 902AN as shown in FRAME AN of FIG. 9A), waveform controller 346 or 446 reprograms the pulse waveform for emitters 208 on peripheral device 114 to reduce the number of pulses per image frame period (810). In one example, waveform controller 346 or 446 may update the waveform parameters to extend the pulse waveform period and thereby reduce the number of pulses per image frame period. For example, waveform controller 346 or 446 may update the waveform parameters to eliminate all but 1 in every remaining prime factor (F) of the number pulses in frame period (e.g., frame period 906). Assuming that the prime factors are 5 and 2 for the number of pulses in frame period 906 in the example shown in FIG. 9A, waveform controller 346 or 446 would update the waveform parameters to eliminate one in every fifth pulse of waveform 903A (e.g., eliminate one pulse from each of the two groups of five pulses shown FIG. 9A) in 810 (e.g., as shown in waveform 903B in FIG. 9B) and thereby extend the pulse waveform period of pulse waveform 903A (e.g., extend pulse waveform period 908A in FIG. 9A to pulse waveform period 908B in FIG. 9B). As shown in FRAME 1B of FIG. 9B, extending the pulse waveform period may cause pulse 904B not to overlap with exposure 902B.

Referring back to FIG. 8, the one or more image capture devices 138 next capture an image frame (e.g., FRAME 1B, image data 330 or 430) (812) and pulse detector 348 or 448 determines whether a pulse (e.g., IF light) of emitters 208 is detected in the captured image frame (814). In response to pulse detector 348 or 448 determining that a pulse (e.g., IF light) of emitters 208 is not detected in the captured image frame (NO branch of 814), waveform controller 346 or 446 reprograms the pulse waveform for emitters 208 on peripheral device 114 to offset the pulse waveform in time based on the previous pulse waveform period (816) to help ensure that a pulse of the pulse waveform (e.g., pulse waveform 903B of FIG. 9B) is detected in a captured image frame (e.g., as shown in FRAME BN of FIG. 9B). For example, at 816 waveform controller 346 or 446 offsets the pulse waveform 903B of FIG. 9B by pulse waveform period 908A of FIG. 9A (e.g., the previous pulse waveform period) after detecting that pulse 904B is not detected in FRAME 1B. Similarly, waveform controller 346 or 446 would offset pulse waveform 903C of FIG. 9C by pulse waveform period 908B of FIG. 9B (e.g., the previous pulse waveform period) after detecting that pulse 904C is not detected in FRAME 1C, offset pulse waveform 903D of FIG. 9D by pulse waveform period 908C of FIG. 9C (e.g., the previous pulse waveform period) after detecting that pulse 904D is not detected in FRAME 1D, and offset pulse waveform 903E of FIG. 9E by pulse waveform period 908D of FIG. 9D (e.g., the previous pulse waveform period) after detecting that pulse 904E is not detected in FRAME 1E at 816 for each of these examples. It should be understood that an offset or delta may have been introduced one or more times between each of FRAMES 1B and BN of FIG. 9B, FRAMES 1C and CN of FIG. 9C, FRAMES 1D and DN of FIG. 9D, and FRAMES 1E and EN of FIG. 9E. These intermediate steps are not shown in FIGS. 9B-9E for simplicity.

Referring back to FIG. 8, in response to pulse detector 348 or 448 determining that a pulse (e.g., IF light) of emitters 208 is detected in a captured image frame (YES branch of 814) (e.g., a pulse 904BN at least partially overlaps with exposure 902BN as shown in FRAME BN of FIG. 9B), pulse emitter synchronizer 344 or 444 determines whether there is a single pulse per image frame (e.g., whether the frame period is the same as the pulse waveform period or emitters 208 only pulse once within frame period 906).

In response to pulse emitter synchronizer 344 or 444 determining that there is more than a single pulse per image frame (NO branch of 818), waveform controller 346 or 446 reprograms the pulse waveform for emitters 208 on peripheral device 114 to reduce the number of pulses per image frame period (810). Again, waveform controller 346 or 446 may update the waveform parameters at 810 to eliminate all but 1 in every remaining prime factor (F) of the number of pulses frame period (e.g., frame period 906). Assuming that the only remaining prime factor is 2 for frame period 906 in the example shown in FIG. 9B, waveform controller 346 or 446 would update the waveform parameters to eliminate one in every other pulse of waveform 903B in FRAME BN of FIG. 9B in 810 and thereby extend the pulse waveform period of pulse waveform 903B (e.g., reduce the number of pulses from eight in FIG. 9B to four in FIG. 9C and extend pulse waveform period 908B in FIG. 9B to pulse waveform period 908C in FIG. 9C). This prime visual search would continue until only a single pulse occurs during an image frame and that single pulse overlaps the exposures of the one or more image capturing devices 138. For example, waveform controller 346 or 446 would update the waveform parameters to eliminate one in every other pulse of waveform 903C in FRAME CN of FIG. 9C in 810 and thereby extend the pulse waveform period of pulse waveform 903C (e.g., reduce the number of pulses from four in FIG. 9C to two in FIG. 9D and extend pulse waveform period 908C in FIG. 9C to pulse waveform period 908D in FIG. 9D) and later update the waveform parameters to eliminate one in every other pulse of waveform 903D in FRAME DN of FIG. 9D in 810 and thereby extend the pulse waveform period of pulse waveform 903D (e.g., reduce the number of pulses from two in FIG. 9D to one in FIG. 9E and extend pulse waveform period 908D in FIG. 9D to pulse waveform period 908E in FIG. 9E).

In response to pulse emitter synchronizer 344 or 444 determining that there is a single pulse per image frame (YES branch of 818) (e.g., as shown in FRAME 9EN of FIG. 9E), the synchronization of emitters 208 on peripheral device 114 with peripheral tracker 342 or 442 is complete (820) (e.g., flowchart 500 may continue to 510 in FIG. 5).

Figure 10A:
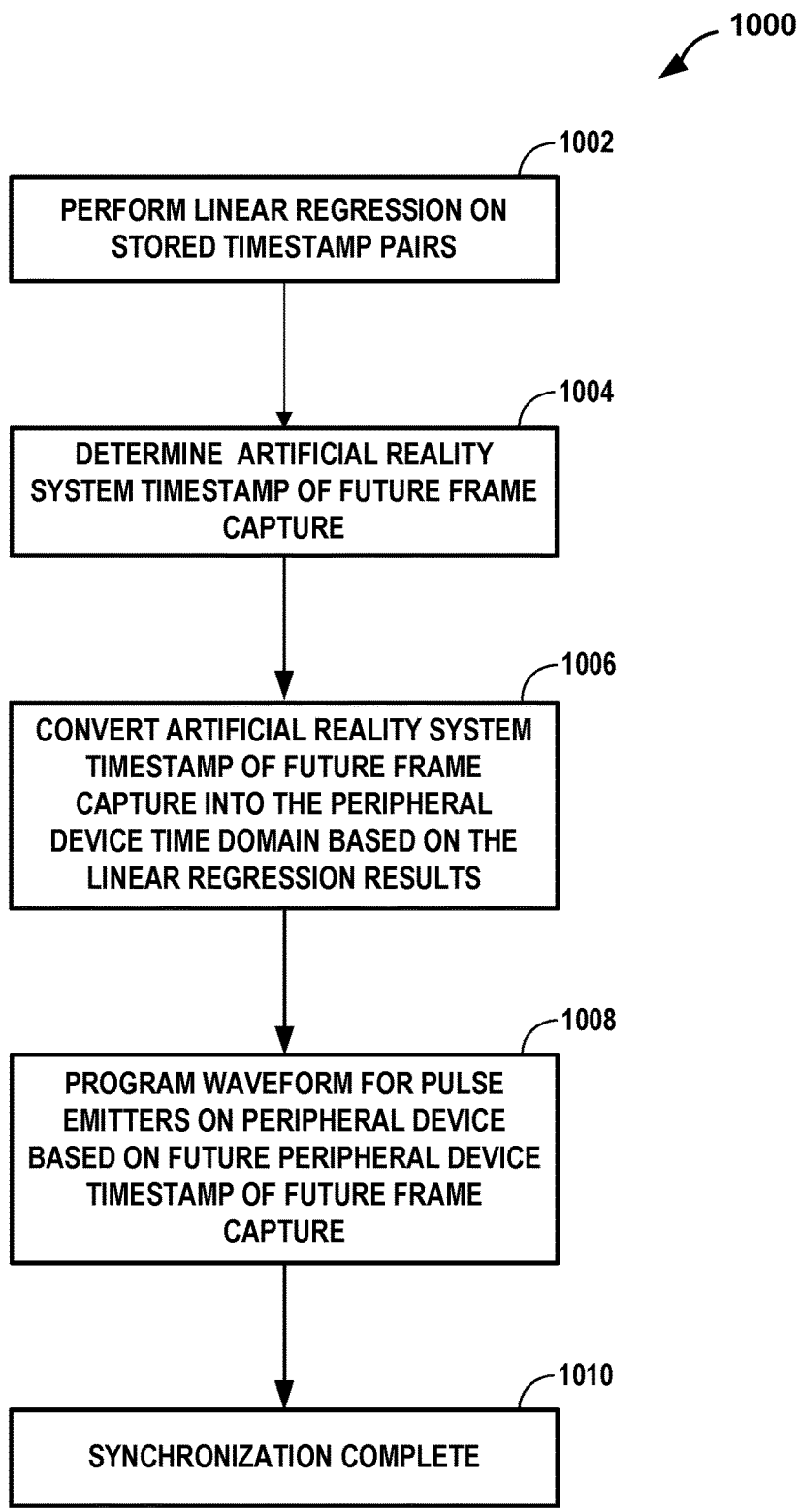
FIG. 10A is a flowchart illustrating example timing operations for synchronizing pulse emitters on a peripheral device in accordance with the techniques of the disclosure.

FIG. 10A is a flowchart 1000 illustrating example timing operations for synchronizing pulse emitters 208 on a peripheral device 114 in accordance with the techniques of the disclosure. Flowchart 1000 is another example of the functions performed in 508 of flowchart 500 in FIG. 5 to help ensure emitters 208 are pulsed at least in part during the small exposure period in which image capture devices 138 obtain image data 330 or 430 (e.g., image frames).

Figure 10B:
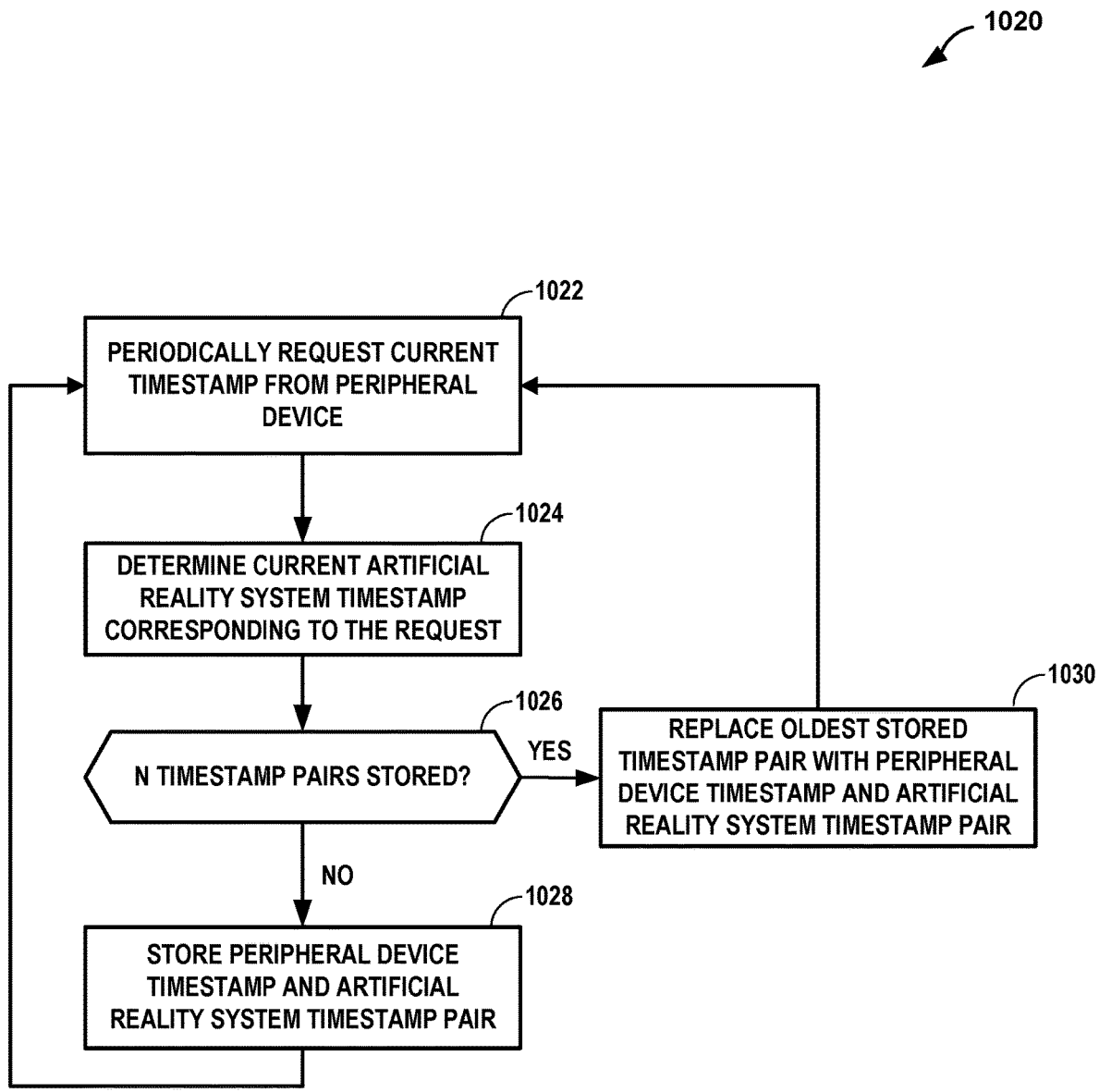
FIG. 10B is a flowchart illustrating example operations for obtaining peripheral device and artificial reality system timestamp pairs to help determine the difference between the peripheral device's time and the artificial reality system's time in accordance with the techniques of the disclosure.

In order to synchronize pulses of emitters 208 on peripheral device 114 with peripheral tracker 342 or 442, pulse emitter synchronizer 344 or 444 may first determine the difference between the peripheral device's time and the artificial reality system's time (e.g., HMD 112's or console's 106 time) by performing a linear regression on stored peripheral device and AR system timestamp pairs in timestamp data 332 or 432 (e.g., timestamp pairs stored as described in flowchart 1020 of FIG. 10B) (1002). Pulse emitter synchronizer 344 or 444 will then determine an AR system timestamp of a future frame capture (1004) convert the AR system timestamp into peripheral device 114's time domain based on the results of the linear regression (1006). In other words, pulse emitter synchronizer 344 or 444 uses the results of the linear regression to estimate the start time of the next (or any subsequent) exposure the peripheral device's time domain.

Next, waveform controller 346 or 446 programs the pulse waveform for emitters 208 on peripheral device 114 based on a future peripheral device timestamp of a future frame capture (1008). For example, waveform controller 346 or 446 instructs, via I/O interface(s) 315 or 415 (e.g., over a wireless protocol, such as Bluetooth, BLE, or Wi-Fi), peripheral device 114 to pulse emitters 208 based on waveform parameters, including when peripheral device 114 will begin pulsing emitters 208 (e.g., the future peripheral device timestamp corresponding to a future frame capture), the duration of time emitters 208 should be active (e.g., active duration), and the duration of time emitters 203 should be inactive (e.g., inactive duration). The synchronization of emitters 208 on peripheral device 114 with peripheral tracker 342 or 442 then completes (1010) (e.g., flowchart 500 may continue to 510 in FIG. 5).

In some examples, pulse emitter synchronizer 344 or 444 may use timestamp data 332 or 432 (e.g., peripheral device and AR system timestamp pairs) to form an initial estimate of clock alignment so as to narrow a search space for visual search operations through image data—resulting in faster clock compensation. That is, rather than rely solely on timing information communicatively exchanged between pulse emitter synchronizer 344 or 444 and the tracked peripheral device 114 (e.g., as describe with reference to FIGS. 10A-10B), pulse emitter synchronizer 344 or 444 may further synchronize pulses of emitters 208 on peripheral device 114 with peripheral tracker 342 or 442 using a visual search operations (e.g., linear visual search operations of FIG. 6, prime visual search operations of FIG. 8) to refine the waveform parameters determined in flowchart 1000 of FIG. 10A. For example, pulse emitter synchronizer 344 or 444 can determine the pulse waveform parameters including a start time of the next (or any subsequent) exposure within the peripheral device's time domain (e.g., as described above with reference to 1002-1006), the duration emitters 208 should be active (e.g., the exposure period), and the duration emitters 203 should be inactive, and waveform controller 346 or 446 may instruct, via I/O interface(s) 315 or 415 (e.g., over a wireless protocol, such as Bluetooth, BLE, or Wi-Fi), peripheral device 114 to pulse emitters 208 based on those pulse waveform parameters.

Once peripheral device 114 starts pulsing emitters 208 according to the pulse waveform parameters determined by pulse emitter synchronizer 344 or 444 (e.g., as described above with reference 1008 of FIG. 10A), pulse emitter synchronizer 344 or 444 can perform a visual search to help ensure emitters 208 are pulsing at least in part during the small exposure period in which image capture devices 138 obtain image data 330 using a linear visual search or a prime factor search. In other words, steps 1002-1008 of flowchart 1000 in FIG. 10A may be performed at step (or instead of step) 602 of flowchart 600 in FIG. 6 or at step (or instead of step) 802 of flowchart 800 in FIG. 8. By using the timing operations of flowchart 1000 in FIG. 10A to determine the initial pulse waveform parameters for the visual search operations of flowchart 600 in FIG. 6 or flowchart 800 of FIG. 8, pulse emitter synchronizer 344 or 444 may reduce the search space for the visual searches in FIGS. 6 and 8 for faster clock compensation than simply performing the steps in FIG. 6 or 8.

FIG. 10B is a flowchart 1020 illustrating example operations for obtaining peripheral device and artificial reality system timestamp pairs to help determine the difference between the peripheral device's time and the artificial reality system's time in accordance with the techniques of the disclosure. In order to synchronize pulses of emitters 208 on peripheral device 114 with peripheral tracker 342 or 442, pulse emitter synchronizer 344 or 444 may need to determine the difference between the peripheral device's time and the artificial reality system's time (e.g., HMD 112's or console's 106 time). To determine this time difference, pulse emitter synchronizer 344 or 444 will periodically request a current timestamp from peripheral device 114 via I/O interface(s) 315 or 415 (e.g., request a current timestamp from clock 310 over a wireless protocol, such as Bluetooth, BLE, or Wi-Fi) (1022).

Next, pulse emitter synchronizer 344 or 444 determines a timestamp of the artificial reality system (e.g., a timestamp from clock 328 or 428) corresponding to the request (1024). In some examples, the timestamp corresponding to the request can be determined to be the time the request was made by pulse emitter synchronizer 344 or 444 or the time (or the estimated time) the request was actually transmitted to peripheral device 114 (e.g., via the I/O interface(s) 315 or 415).

Next, pulse emitter synchronizer 344 or 444 determines whether a number (N) (e.g., 10, 20, 100, or any number) of timestamps have been stored (e.g., in timestamp data 332 or 432) (1026). In response to determining that N timestamps have not been stored (NO branch of 1026), pulse emitter synchronizer 344 or 444 will store the new peripheral device and AR system timestamp pair in timestamp data 332 or 432 (1028). In response to determining that N timestamps have been stored (YES branch of 1026), pulse emitter synchronizer 344 or 444 will replace the oldest stored timestamp pair in timestamp data 332 or 432 with the new peripheral device and AR system timestamp pair (1030). Maintaining N recent timestamp pairs in timestamp data 332 or 432 for use in determining the difference between the peripheral device's time and the artificial reality system's time (e.g., as described above with reference to FIG. 10A) may help compensate for any recent drift variations between clocks 310 and 328/428.

The description above of various aspects of the disclosure has been presented in the context of an artificial reality system. The techniques described herein can be implemented as well in other types of systems that use image or other sensor data to determine positions of objects that may move in and out of a field of view of a camera or sensor.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
   a head mounted display (HMD) configured to output artificial reality content;
   one or more image capture devices configured to capture image data of a peripheral device positioned within a physical environment, wherein the image data comprises a plurality of successive image frames, and wherein the one or more image capture devices capture each image frame during an exposure window of a respective frame period;
   a waveform controller configured to program a pulse waveform for a plurality of emitters on the peripheral device, wherein the pulse waveform specifies a pattern by which the plurality of emitters emit light;
   a pulse emitter synchronizer configured to synchronize the pulse waveform for the plurality of emitters on the peripheral device with the exposure window over the successive image frames from the one or more image capture devices, wherein to synchronize the pulse waveform, the pulse emitter synchronizer is configured to store timestamp pairs from the peripheral device and the artificial reality system, and process the stored timestamp pairs to determine an initial delta to offset the pulse waveform in time; and
   a pulse detector configured to process an image frame of the image data to determine whether the plurality of emitters of the peripheral device are active within the exposure window of the image frame, and
   wherein the pulse emitter synchronizer is further configured to reprogram the pulse waveform to offset the pulse waveform in time in response to a determination that the plurality of emitters are not active within the image frame.

2. The artificial reality system of claim 1, wherein the pulse emitter synchronizer is configured to synchronize the pulse waveform for the plurality of emitters on the peripheral device with the exposure window based on a linear visual search, wherein the linear visual search comprises:
   capturing, by the one or more image capture devices, a current image frame,
   processing, by the pulse detector, the current image frame to determine whether the plurality of emitters of the peripheral device are active within the exposure window of the current image frame,
   in response to a determination, by the pulse detector, that the plurality of emitters are not active within the exposure window of the current image frame, reprogramming, by the pulse emitter synchronizer, the pulse waveform to offset the pulse waveform in time by a delta and repeating the linear visual search, and
   in response to a determination, by the pulse detector, that the plurality of emitters are active within the exposure window of the current image frame, forgoing repeating the linear visual search.

3. The artificial reality system of claim 1, wherein the pulse emitter synchronizer configured to synchronize the pulse waveform for the plurality of emitters on the peripheral device with the exposure window based on a prime visual search, wherein the prime visual search comprises:
  programming, by the waveform controller, the pulse waveform with a first pulse waveform period of the pulse waveform that is shorter than the respective frame period such that the plurality of emitters are active a number of times during the respective frame period;
  reprogramming, by the pulse emitter synchronizer, the pulse waveform to offset the pulse waveform in time by a delta until the pulse detector determines that the plurality of emitters are active within one of the successive image frames from the one or more image capture devices,
  reprogramming, by the pulse emitter synchronizer, the pulse waveform with a second pulse waveform period to reduce the number of times the plurality of emitters are active during the respective frame period based on a prime factor of the number,
  capturing, by the one or more image capture devices, a respective image frame,
  reprogramming, by the pulse emitter synchronizer, the pulse waveform to offset the pulse waveform in time by the first pulse waveform period until the pulse detector determines that the plurality of emitters are active within one of the successive image frames from the one or more image capture devices.

4. The artificial reality system of claim 1, further comprising:
  a peripheral tracker configured to process the image data to determine respective locations for at least a subset of the active plurality of emitters within an image frame of the image data to determine a peripheral device pose representing a position and orientation of the peripheral device based on the respective locations for the subset of the active plurality of emitters within the image frame.

5. The artificial reality system of claim 4, further comprising:
  a rendering engine configured to render for display at the HMD the artificial reality content and at least one graphical object in accordance with the peripheral device pose.

6. The artificial reality system of claim 1, wherein the waveform controller communicates with the peripheral device via a wireless protocol comprising one of Bluetooth, Bluetooth Low Energy (BLE), or Wi-Fi.

7. The artificial reality system of claim 1, wherein the peripheral device comprises one of a keyboard, a mouse, or a hand-held controller.

8. The artificial reality system of claim 1, wherein the plurality of emitters are arranged on a same face of the peripheral device.

9. The artificial reality system of claim 1, wherein the plurality of emitters comprises three or more emitters.

10. The artificial reality system of claim 1, wherein the plurality of emitters comprises a plurality of LED lights.

11. A method comprising:
  obtaining, by an artificial reality system including a head-mounted display (HMD), image data of a peripheral device positioned within a physical environment via one or more image capture devices, wherein the HMD is configured to output artificial reality content, wherein the image data comprises a plurality of successive image frames, and wherein the one or more image capture devices capture each image frame during an exposure window of a respective frame period;
  programming, by a waveform controller, a pulse waveform for a plurality of emitters on the peripheral device, wherein the pulse waveform specifies a pattern by which the plurality of emitters emit light;
  synchronizing, by a pulse emitter synchronizer, the pulse waveform for the plurality of emitters with the exposure window over the successive image frames from the one or more image capture devices, wherein synchronizing the pulse waveform includes storing timestamp pairs from the peripheral device and the artificial reality system, and processing the stored timestamp pairs to determine an initial delta to offset the pulse waveform in time;
  processing an image frame of the image data to determine whether the plurality of emitters of the peripheral device are active within the exposure window of the image frame;
  reprogramming the pulse waveform to offset the pulse waveform in time in response to a determination that the plurality of emitters are not active within the image frame; and
  processing, by a peripheral tracker and after reprogramming the pulse waveform, the image data to determine respective locations for at least a subset of the active plurality of emitters within an image frame of the image data to determine a peripheral device pose representing a position and orientation of the peripheral device based on the respective locations for the subset of the active plurality of emitters within the image frame.

12. The method of claim 11, wherein synchronizing the pulse waveform for the plurality of emitters on the peripheral device with the exposure window is based on a linear visual search comprising:
  capturing, by the one or more image capture devices, a current image frame,
  processing, by the pulse detector, the current image frame to determine whether the plurality of emitters of the peripheral device are active within the exposure window of the current image frame,
  in response to a determination, by the pulse detector, that the plurality of emitters are not active within the exposure window of the current image frame, reprogramming, by the pulse emitter synchronizer, the pulse waveform to offset the pulse waveform in time by a delta and repeating the linear visual search, and
  in response to a determination, by the pulse detector, that the plurality of emitters are active within the exposure window of the current image frame, forgoing repeating the linear visual search.

13. The method of claim 11, wherein synchronizing the pulse waveform for the plurality of emitters on the peripheral device with the exposure window is based on a prime visual search comprising:
  programming, by the waveform controller, the pulse waveform with a first pulse waveform period of the pulse waveform that is shorter than the respective frame period such that the plurality of emitters are active a number of times during the respective frame period;
  reprogramming, by the pulse emitter synchronizer, the pulse waveform to offset the pulse waveform in time by a delta until the pulse detector determines that the plurality of emitters are active within one of the successive image frames from the one or more image capture devices, reprogramming, by the pulse emitter synchronizer, the pulse waveform with a second pulse waveform period to reduce the number of times the plurality of emitters are active during the respective frame period based on a prime factor of the number, capturing, by the one or more image capture devices, a respective image frame, reprogramming, by the pulse emitter synchronizer, the pulse waveform to offset the pulse waveform in time by the first pulse waveform period until the pulse detector determines that the plurality of emitters are active within one of the successive image frames from the one or more image capture devices.

14. The method of claim 11, further comprising:
rendering for display at the HMD the artificial reality content and at least one graphical object in accordance with the peripheral device pose.

15. A non-transitory, computer-readable medium comprising instructions that, when executed, cause one or more processors of an artificial reality system including a head-mounted display (HMD) configured to output artificial reality content to:

capture image data of a peripheral device positioned within a physical environment, wherein the image data comprises a plurality of successive image frames, and wherein the one or more image capture devices capture each image frame during an exposure window of a respective frame period;

program a pulse waveform for a plurality of emitters on the peripheral device, wherein the pulse waveform specifies a pattern by which the plurality of emitters emit light;

synchronize the pulse waveform for the plurality of emitters on the peripheral device with the exposure window over the successive image frames from the one or more image capture devices, wherein synchronizing the pulse waveform includes storing timestamp pairs from the peripheral device and the artificial reality system, and processing the stored timestamp pairs to determine an initial delta to offset the pulse waveform in time;

process an image frame of the image data to determine whether the plurality of emitters of the peripheral device are active within the exposure window of the image frame;

reprogram the pulse waveform to offset the pulse waveform in time in response to a determination that the plurality of emitters are not active within the image frame; and after reprogramming the pulse waveform, process the image data to determine respective locations for at least a subset of the active plurality of emitters within an image frame of the image data to determine a peripheral device pose representing a position and orientation of the peripheral device based on the respective locations for the subset of the active plurality of emitters within the image frame.

* * * * *